(12) United States Patent
Duree et al.

(10) Patent No.: US 6,178,170 B1
(45) Date of Patent: Jan. 23, 2001

(54) SYSTEM AND METHOD FOR TRANSPORTING A CALL

(75) Inventors: Albert Daniel Duree, Independence, MO (US); Joseph Michael Christie, deceased, late of San Bruno, CA (US); by Joseph S. Christie, legal representative; by Jean M. Christie, legal representative, both of Mt. Pleasant, PA (US); Mark Sucharczuk, Mountain View, CA (US)

(73) Assignee: Sprint Communications Company, L. P., Kansas City, MO (US)

( * ) Notice: Under 35 U.S.C. 154(b), the term of this patent shall be extended for 0 days.

(21) Appl. No.: 08/855,621

(22) Filed: May 13, 1997

(Under 37 CFR 1.47)

(51) Int. Cl.[7] ................................................ H04L 12/56
(52) U.S. Cl. .............................................. 370/395; 370/465
(58) Field of Search ..................................... 370/395, 389, 370/464, 465, 466, 335, 337, 410, 474, 471, 472, 473, 351, 352, 468, 477, 522, 469; 375/241, 242, 240; 380/23; 348/348, 394; 379/95.13, 93.14, 93.09, 219, 229, 230, 231

(56) References Cited

U.S. PATENT DOCUMENTS

| 4,201,889 | 5/1980 | Lawrence et al. . |
| 4,310,727 | 1/1982 | Lawser . |
| 4,348,554 | 9/1982 | Asmuth . |
| 4,453,247 | 6/1984 | Suzuki et al. . |

(List continued on next page.)

FOREIGN PATENT DOCUMENTS

| 90312739 | 7/1991 | (EP) . |
| 91303312 | 10/1991 | (EP) . |
| 91311342 | 7/1992 | (EP) . |
| 92307752 | 9/1993 | (EP) . |
| 870284896 | 5/1989 | (JP) . |
| 07050057 | 9/1996 | (JP) . |
| WO/9406251 | 3/1994 | (WO) . |
| WO95/04436 | 2/1995 | (WO) . |

OTHER PUBLICATIONS

Beckman, Richard T. and Matthews, Joseph R., "Proposal for a Physical Architecture Based on the Harmonized Functional Architecture," Committee T1 Contribution T1S1.5/95–02/, Bellcore, (Feb. 20, 1995).*

(List continued on next page.)

*Primary Examiner*—Dang Ton
(74) *Attorney, Agent, or Firm*—Harley R. Ball

(57) ABSTRACT

A system and method for transporting a call having call signaling and voiceband user communications through an asynchronous transfer mode system identifies when compression, encryption, or another processing option has been applied to the voiceband user communications. A first signaling processor processes the call signaling to identify a selected first connection and a processing option, such as a compression method, to be applied to the voiceband user communications. The first signaling processor transports a control message to a first interworking unit identifying the selected connection and the selected compression method. The first interworking unit compresses the voiceband user communications with the selected compression method, sets a convergence sublayer indicator bit as an indicator in an asynchronous transfer mode cell, fills the cell with the compressed voiceband user communications, and transports the cell over the selected connection. A second interworking unit receives the asynchronous transfer mode cell, and interworks the cell according to a decompression method for the voiceband user communications if the convergence sublayer indicator bit is set.

98 Claims, 10 Drawing Sheets

U.S. PATENT DOCUMENTS

| | | |
|---|---|---|
| 4,554,659 | 11/1985 | Blood et al. . |
| 4,565,903 | 1/1986 | Riley . |
| 4,683,563 | 7/1987 | Rouse et al. . |
| 4,730,312 | 3/1988 | Johnson . |
| 4,736,364 | 4/1988 | Basso et al. . |
| 4,748,658 | 5/1988 | Gopal . |
| 4,823,338 | 4/1989 | Chan et al. . |
| 4,853,955 | 8/1989 | Thorn et al. . |
| 4,896,319 | 1/1990 | Lidinsky et al. . |
| 4,916,690 | 4/1990 | Barri . |
| 4,926,416 | 5/1990 | Weik . |
| 4,985,889 | 1/1991 | Frankish et al. . |
| 4,991,204 | 2/1991 | Yamamoto et al. . |
| 4,993,014 | 2/1991 | Gordon . |
| 5,003,584 | 3/1991 | Benyacar . |
| 5,018,191 | 5/1991 | Catron et al. . |
| 5,048,081 | 9/1991 | Gavaras . |
| 5,058,104 | 10/1991 | Yonehara et al. . |
| 5,067,123 | 11/1991 | Hyodo et al. . |
| 5,084,867 | 1/1992 | Tachibana et al. . |
| 5,089,954 | 2/1992 | Rago . |
| 5,091,903 | 2/1992 | Schrodi . |
| 5,101,404 | 3/1992 | Kunimoto et al. . |
| 5,115,431 | 5/1992 | Williams et al. . |
| 5,163,057 | 11/1992 | Grupp . |
| 5,168,492 | 12/1992 | Beshai et al. . |
| 5,179,556 | 1/1993 | Turner . |
| 5,185,743 | 2/1993 | Murayama . |
| 5,193,110 | 3/1993 | Jones et al. . |
| 5,204,857 | 4/1993 | Obara . |
| 5,216,669 | 6/1993 | Hofstetter et al. . |
| 5,218,602 | 6/1993 | Grant et al. . |
| 5,231,631 | 7/1993 | Buhrke et al. . |
| 5,231,633 | 7/1993 | Hluchyi et al. . |
| 5,233,607 | 8/1993 | Barwig et al. . |
| 5,239,539 | 8/1993 | Uchida et al. . |
| 5,249,178 | 9/1993 | Kurano et al. . |
| 5,251,255 | 10/1993 | Epley . |
| 5,253,247 | 10/1993 | Hirose et al. . |
| 5,255,266 | 10/1993 | Watanabe et al. . |
| 5,258,752 | 11/1993 | Fukaya et al. . |
| 5,258,979 | 11/1993 | Oomuro et al. . |
| 5,268,895 | 12/1993 | Topper . |
| 5,271,010 | 12/1993 | Miyake . |
| 5,274,680 | 12/1993 | Sorton et al. . |
| 5,278,889 | 1/1994 | Papanicolaou et al. . |
| 5,282,244 | 1/1994 | Fuller et al. . |
| 5,285,441 | 2/1994 | Bansal et al. . |
| 5,291,479 | 3/1994 | Vaziri et al. . |
| 5,306,318 | 4/1994 | Bachhuber et al. . |
| 5,311,509 | 5/1994 | Heddes et al. . |
| 5,317,562 | 5/1994 | Nardin et al. . |
| 5,323,389 | 6/1994 | Bitz et al. . |
| 5,327,421 | 7/1994 | Hiller et al. . |
| 5,329,308 | 7/1994 | Binns et al. . |
| 5,339,318 | 8/1994 | Tanaka . |
| 5,345,443 | 9/1994 | D'Ambrogio et al. . |
| 5,345,445 | 9/1994 | Hiller . |
| 5,345,446 | 9/1994 | Hiller . |
| 5,357,510 | 10/1994 | Norizuki et al. . |
| 5,363,433 | 11/1994 | Isono . |
| 5,365,524 | 11/1994 | Hiller et al. . |
| 5,367,566 | 11/1994 | Moe et al. . |
| 5,373,504 | 12/1994 | Tanaka et al. . |
| 5,375,124 | 12/1994 | D'Ambrogio . |
| 5,377,186 | 12/1994 | Wegner . |
| 5,384,771 | 1/1995 | Isidoro et al. . |
| 5,384,840 | 1/1995 | Blatchford et al. . |
| 5,392,402 | 2/1995 | Robrock . |
| 5,394,393 | 2/1995 | Brisson et al. . |
| 5,394,398 | 2/1995 | Rau . |
| 5,406,550 | * 4/1995 | McTiffin ............................... 370/395 |
| 5,414,701 | 5/1995 | Shtayer et al. . |
| 5,418,783 | 5/1995 | Yamaki et al. . |
| 5,420,857 | 5/1995 | Jurkevich . |
| 5,420,858 | 5/1995 | Marshall et al. . |
| 5,420,916 | 5/1995 | Sekiguchi . |
| 5,422,882 | 6/1995 | Hiller . |
| 5,425,090 | 6/1995 | Orriss . |
| 5,426,636 | 6/1995 | Hiller et al. . |
| 5,428,607 | 6/1995 | Hiller et al. . |
| 5,428,609 | 6/1995 | Eng et al. . |
| 5,434,852 | 7/1995 | LaPorta . |
| 5,434,981 | 7/1995 | Lenihan et al. . |
| 5,440,563 | 8/1995 | Isidoro et al. . |
| 5,444,713 | 8/1995 | Backaus et al. . |
| 5,446,738 | 8/1995 | Kim et al. . |
| 5,452,297 | 9/1995 | Hiller et al. . |
| 5,453,981 | 9/1995 | Katsube et al. . |
| 5,454,034 | 9/1995 | Martin . |
| 5,457,684 | 10/1995 | Bharucha . |
| 5,459,722 | * 10/1995 | Sherif .................................. 370/395 |
| 5,463,620 | 10/1995 | Sriram . |
| 5,463,621 | 10/1995 | Suzuki . |
| 5,473,677 | 12/1995 | D'Amato . |
| 5,473,679 | 12/1995 | LaPorta . |
| 5,477,537 | 12/1995 | Dankert et al. . |
| 5,479,401 | 12/1995 | Bitz et al. . |
| 5,479,402 | 12/1995 | Hata et al. . |
| 5,479,495 | 12/1995 | Blumhardt . |
| 5,483,527 | 1/1996 | Doshi et al. . |
| 5,485,455 | 1/1996 | Dobbins et al. . |
| 5,495,484 | 2/1996 | Self et al. . |
| 5,504,742 | 4/1996 | Kakuma et al. . |
| 5,506,844 | 4/1996 | Rao . |
| 5,509,010 | 4/1996 | LaPorta . |
| 5,509,123 | 4/1996 | Dobbins et al. . |
| 5,513,178 | 4/1996 | Tanaka . |
| 5,519,707 | 5/1996 | Subramanian et al. . |
| 5,521,910 | 5/1996 | Matthews . |
| 5,522,042 | 5/1996 | Fee et al. . |
| 5,526,414 | 6/1996 | Bedard et al. . |
| 5,533,106 | 7/1996 | Blumhardt . |
| 5,539,698 | 7/1996 | Kozaki et al. . |
| 5,539,815 | 7/1996 | Samba . |
| 5,539,816 | 7/1996 | Pinard et al. . |
| 5,539,884 | 7/1996 | Robrock . |
| 5,541,918 | 7/1996 | Ganmukhi et al. . |
| 5,541,926 | 7/1996 | Saito et al. . |
| 5,544,152 | 8/1996 | Obermanns et al. . |
| 5,544,161 | 8/1996 | Bigham et al. . |
| 5,548,580 | 8/1996 | Buckland . |
| 5,550,819 | 8/1996 | Duault . |
| 5,550,914 | 8/1996 | Clarke et al. . |
| 5,563,939 | 10/1996 | La Porta et al. . |
| 5,566,173 | 10/1996 | Steinbrecher . |
| 5,568,475 | 10/1996 | Doshi . |
| 5,570,368 | 10/1996 | Murakami et al. . |
| 5,577,039 | 11/1996 | Won et al. . |
| 5,579,311 | 11/1996 | Chopping et al. . |
| 5,587,999 | 12/1996 | Endo . |
| 5,592,477 | 1/1997 | Farris et al. . |
| 5,600,640 | 2/1997 | Blair et al. . |
| 5,600,643 | 2/1997 | Robrock . |
| 5,623,491 | 4/1997 | Skoog . |
| 5,627,836 | 5/1997 | Conoscenti et al. . |
| 5,629,930 | 5/1997 | Beshai et al. . |
| 5,635,980 | 6/1997 | Lin et al. . |
| 5,636,210 | 6/1997 | Agrawal et al. . |
| 5,640,446 | 6/1997 | Everett et al. . |
| 5,666,349 | 9/1997 | Petri . |

| | | |
|---|---|---|
| 5,673,262 | 9/1997 | Shimizu . |
| 5,680,390 | 10/1997 | Robrock . |
| 5,684,792 | 11/1997 | Ishihara . |
| 5,703,876 | 12/1997 | Christie . |
| 5,708,702 | 1/1998 | DePaul et al. . |
| 5,710,769 | 1/1998 | Anderson et al. . |
| 5,719,863 | 2/1998 | Hummel . |
| 5,751,706 | 5/1998 | Land . |
| 5,805,568 | 9/1998 | Shinbashi . |
| 5,825,780 | 10/1998 | Christie . |
| 5,920,562 | 7/1999 | Christie et al. . |
| 5,926,482 | 7/1999 | Christie . |
| 5,940,393 | 8/1999 | Duree et al. . |
| 5,940,491 | 8/1999 | Anderson et al. . |
| 5,991,301 | 11/1999 | Christie . |
| 6,023,474 | 2/2000 | Gardner . |

OTHER PUBLICATIONS

Yoshikai, N., et al., "Report of the Meeting of SWP 13/1–4 (Draft Recommendation I.580)," ITU–1 Telecommunication Standardization Sector, Study Group 13, pp. 1–51, (Mar. 7–18, 1994).*

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).*

Ohta, S., et al., "A Dynamically Controllable ATM Transport Network Based on the Virtual Path Concept," Communications for the Information Age, Globecom '88, Conference Record, p. 1272–1276, (Nov. 28–Dec. 1, 1988).*

Fukazawa, M., et al., "Intelligent Network Call Model for Broadband ISDN," Fujitsu Laboratories, Ltd. (Japan), p. 30.6.1–30.6.5.*

Minzer, Steven, "A Signaling Protocol for Complex Multimedia Services," IEEE Journal on Selected Areas in Communications (ISSN 0733–8716), vol.9 (No. 9), p. 1383–1394, (Dec. 1991).*

Faynberg, I., et al., "The Support of Network Interworking and Distributed Context Switching in the IN Service Data Function Model," 2nd Colloque International, ICIN 92, p. 11–16, (Mar. 1992).*

Woodworth, Clark B., et al., "A Flexible Broadband Packet Switch for a Multimedia Integrated Network," International Conference on Communications, Denver, ICC–91, p. 3.2.1–3.2.8, (Jun. 1991).*

Miller, P., "Intelligent Network/2: A flexible framework for exchange services," Bell Communications Research Exchange, vol. 3 ( No. 3), (May/Jun. 1987).*

Cooper, C., et al., "Toward a Broadband Congestion Control Strategy," IEEE Network, The Magazine of Computer Communications, (May 1990).*

Batten, A., "Personal Communications Services and the Intelligent Network," British Telecommunications Engineering, (Aug. 1990).*

Fujioka, M., et al., "Universal Service Creation and Provision Environment for Intelligent Network," IEEE Communications Magazine, (Jan. 1991).*

Andrews, F., "Switching in a Competitive Market," IEEE Communications Magazine, (Jan. 1991).*

N/A, "Network Signaling," Telephony, TCX12004, University of Excellence, p. 5.8–5.17, (Oct. 21, 1991).*

Garrahan, J.J., et al., "Intelligent Network Overview," IEEE Communications Magazine, p. 30–36, (Mar. 1993).*

Johnson, M.A., et al., "New Service Testing Functions for Advanced Intelligent Networks," IEEE 1992 Network Operations and Management Symposium, p. 709–720, (Apr. 6, 1992).*

Yeh, S.Y., et al., "The Evolving Intelligent Network Architecture," IEEE Conference on Computer and Communication Systems, p. 835–839, (1990).*

Atoui, M., "Virtual Private Network Call Processing in the Intelligent Network," International Conference on Communications, p. 561–565, (1992).*

Bosco, P., et al., "A Laboratory for AIN Service Design and Validation," International Conference on Communications, p. 566–571, (Jun. 14, 1992).*

Homa, J., et al., "Intelligent Network Requirements for Personal Communications Services," IEEE Communications Magazine, p. 70–76, (Feb. 1992).*

Russo, E.G., et al., "Intelligent Network Platforms in the U.S.," AT&T Technical Journal, p. 26–43, (1991).*

Van Den Broek, W., et al., "RACE 2066–Functional models of UMTS and integration into the future networks," Electronics & Communications Engineering Journal, p. 165–172, (Jun. 1993).*

Pinkham, G., et al., "The Ericsson Approach to Intelligent Networks," IEEE Global Telecommunications Conference & Exhibition, Session 10, paragraph 4, p. 320–324, (1988).*

N/A, "ANSI–TI.111–1992, Signaling System No. 7 (SS7)—Message Transfer Part (MTP)," American National Standard for Telecommunications.*

N/A, "ANSI–TI.112–1992, Signaling System No. 7 (SS7)—Signaling Connection Control Part (SCCP)," American National Standard for Telecommunications.*

N/A, "ANSI–TI.113–1992, Signaling System No. 7 (SS7)—Integrated Services digital Network (ISDN) User Part," American National Standard for Telecommunications.*

N/A, "ANSI–TI.113a–1993, Signaling System No. 7 (SS7)—Integrated Services Digital Network (ISDN) User Part (NxDSO Multi–rate Connection)," American National Standard for Telecommunications.*

N/A, "ANSI–TI.113–1995, Signaling System No. 7 (SS7)—Integrated Services Digital Network (ISDN) User Part," American National Standard for Telecommunications.*

N/A, "ATM at a Glance," Transmission Technologies Access Guide, p. 40–42, (1993).*

Paglialunga, A., "ISCP Baseline Document (Ver 3.1)," ITU Telecommunication Standardization Sector, Centre Studi E Laboratori Telecommununicazioni S.p.A., (1993).*

N/A, "A Technical Report on Speech Packetization," Document T1A1/94—Prepared by T1A1.7, Working Group on Specialized Signal Processing.*

N/A, "Draft Revised Recommendation I.580," ITU—Telecommunication Standardization Sector, Study Group 13, (Jul. 10–21, 1995).*

Sprague, David, "MTP Level–3 Gateway STP Release 3.2.0," TEKELEC, p. 1–48, (Aug. 4, 1995).*

McDysan, David E. and Spohn, Darren L., "ATM Theory and Application," ATM Layer VPI/VCI Level Addressing, p. 256: 9.3.1, (1994).*

Minoli, Daniel and Dobrowski, George, "Principles of Signaling for Cell Relay and Frame Relay," DVI Comm., Inc./Stevens Institute of Technology/Bell Comm. Research (Bellcore), p. 1–2, 5–6 and 229, (1994).*

N/A, "B–IDSN ATM Adaptation Layer (AAL) Specification, Types 1 & 2," ITU Draft Recommendation I.363.1, (Jul. 21, 1995).*

N/A, "Circuit Emulation Service Interoperability Specification Version 2.0 (Baseline Draft), 95–1504," The ATM Forum Technical Committee, (Dec. 1995).*

N/A, "IN/B–ISDN Signalling Three Ways of Integration," ITU—Telecommunication Standardization Sector, Study Group 11, (Nov. 29–Dec. 17, 1993).*

N/A, "Interworking B–ISUP and Q.93B for DDI, MSN, TP and SUB," ITU—Telecommunication Standardization Sector, Study Group 11, (Nov. 29–Dec. 17, 1993).*

N/A, "Revised Draft of Q.2650 (DSS2/B–ISUP Interworking Recommendation)," ITU—Telecommunication Standardization Sector, Study Group 11, (Nov. 29.–Dec. 17, 1993).*

N/A, "Draft Broadband / Narrowband NNI interworking recommendation," ITU—Telecommunication Standardization Sector, Study Group 11, (Dec. 1993).*

N/A, "Draft Recommendation Q.2761," ITU—Telecommunication Standardization Sector, Study Group 11, (Nov. 29–Dec. 17, 1993).*

N/A, "Draft Recommendation Q.2762," ITU—Telecommunication Standardization Sector, Study Group 11, (Nov. 29–Dec. 17, 1993).*

N/A, "Q.2931 Overview," ITU—Telecommunication Standardization Sector, (Nov. 29–Dec. 17, 1993).*

N/A, "Clean final draft text for B–ISUP formats and codes (Q.2763) in ASN.1," ITU—Telecommunication Standardization Sector, Study Group 11, (Nov. 29–Dec. 17, 1993).*

N/A, "Updated draft of Q.2764 (BQ.764)," ITU—Telecommunication Standardization Sector, Study Group 11, (Nov. 29–Dec. 17, 1993).*

N/A, "Final B–ISUP SDLs," ITU—Telecommunication Standardization Sector, Study Group 11, (Nov. 29–Dec. 17, 1993).*

N/A, "Draft Recommendation Q.2650," ITU—Telecommunication Standardization Sector, Study Group 11, (Nov. 29–Dec. 17, 1993).*

N/A, "Revised Draft of Q.2650 (DSS2/B–ISUP Interworking Recommendation)," ITU—Telecommunication Standardization Sector, Study Group 11, (Nov. 29–Dec. 17, 1993).*

N/A, "Revision of Recommendation of Q.850," ITU—T SG 11 WP 2, (Dec. 2–15, 1993).*

N/A, "Draft Text for Q.2931 (CH. 1, 2 and 3)," ITU—Telecommunication Standardization Sector, Study Group 11, (Dec. 1993).*

N/A, "Q.2931, Clause 4—Information Elements," ITU—Telecommunication Standardization Sector, (Nov. 29–Dec. 17, 1993).*

N/A, "Section 5 of Q.93B," ITU—Telecommunication Standardization Sector, Group Study 11, (Nov. 29–Dec. 17, 1993).*

N/A, "Chapter 6 of Recommendation Q.93B," ITU—Telecommunication Standardization Sector, Study Group 11, (Nov. 29–Dec. 17, 1993).*

N/A, "Clauses 7 and 8 of Q.2931," ITU—Telecommunication Standardization Sector, Study Group 11, (Dec. 1993).*

N/A, "Revised Q.2931 User Side SDL Diagrams," ITU—Telecommunication Standardization Sector, Study Group 11, (Nov. 29–Dec. 17, 1993).*

N/A, "Revised Q.2931 Network Side SDL Diagrams," ITU—Telecommunication Standardization Sector, Study Group 11, (Nov. 29–Dec. 17, 1993).*

N/A, "AnnexesB, C, D, F, H and I of Q.2931," ITU—Telecommunication Standardization Sector, Study Group 11, (Nov. 29–Dec. 17, 1993).*

N/A, "Annex E of Recommendation Q.93B," ITU—Telecommunication Standardization Sector, Study Group 11, (Nov. 29–Dec. 17, 1993).*

N/A, "Rec. Q.2931, Annex G—Status Monitoring of SPCs," ITU—Telecommunication Standardization Sector, Study Group 11, (Nov. 29–Dec. 17, 1993).*

N/A, "Annex J of Q.2931," ITU—Telecommunication Standardization Sector, Study Group 11, (Dec. 1993).*

N/A, "Appendix 1/Q.2931: Guidelines for the Use of Instruction Indicators," ITU—Telecommunication Standardization Sector, Study Group 11, (Nov. 29–Dec. 17, 1993).*

N/A, "Draft text for Q.2931: Appendix II (Information Items Required for Connection Establishment and Routing in B–ISDN)," ITU—Telecommunication Standardization Sector, Study Group 11.*

N/A, "General Recommendations on Telephone Switching and Signalling—Intelligent Network / Distributed Functional Plane for Intelligent Network CS–1," ITU–T Recommendation Q.1214.*

Kumar, Sanjay, "Legacy Voice Service at a Native ATM Terminal," ATM_Forum/95–0917R1, ATM Forum Technical Committee, (Oct. 2–6, 1995).*

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).*

Choi, Don, "Requirements for ATM Trunking," ATM_Forum/95–1401, ATM Forum Technical Committee, (Oct. 2–6, 1995).*

Chiang, Chin, "Proposed Changes to Proxy Signaling Capability," ATM Forum/95–0046, ATM Forum: Signaling Working Group, (Feb. 6–10, 1995).*

Amin–Salehi, Bahman, "Third Party Call Setup for a Video–on Demand Connection Establishment," ATM_Forum/95–0022, ATM Forum Technical Committee, (Feb. 5–8, 1995).*

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).*

Schink, Helmut, et al., "CES as a Flexible Trunking Method," ATM_Forum/95–1157, ATM Forum Technical Committee, (Oct. 2–6, 1995).*

Duault, Maurice, "Proposal for ATM Trunking Options," ATM_Forum/95–1230, ATM Forum Technical Committee, (Oct. 2–6, 1995).*

Okutani, Takenori, et al., "VTOA: Reference Configuration––ATM Trunking for Narrowband Services," ATM–Forum/95–1364, ATM Forum Technical Committee, (Oct. 2–6, 1995).*

Stodola, Kevin, "Circuit Emulation Services Version 2 Baseline," ATM_Forum/95–1504, ATM Forum Technical Committee, (Dec. 11–15, 1995).*

N/A, "I.751 Asynchronous Transfer Mode (ATM) Management View of the Network Element View," ITU—Telecommunications Standardization Sector, Study Group 15, (Nov. 13–24, 1995).*

N/A, "Draft I.732," ITU—Telecommunication Standardization Sector, Study Group 15, (Nov. 13–24, 1995).*

N/A, "Editorial Modificaitons for Draft New ITU–T Recommendation I.731," ITU—Telecommunication Standardization Sector, Study Group 15, (Nov. 13–24, 1995).*

Buhrke, R.E., "Proposed Unified Functional Model," T1S1.5/95–036, Committee T1 Contribution, (Feb. 1995).*

Beckman, Richard T. and Mathews, Joseph R., "Proposal for a Physical Architecture Based on the Harmonized Functional Architecture," T1S1.5/95–027, Committee T1 Contribution, (Feb. 20–24, 1995).*

Shenoda et. al., "A Method For Dynamic Bandwidth Allocation For Voice Trunking Using CES With CAS," ATM Forum Technical Committee 96–0136, Feb. 5, 1996.*

Wada, VTOA: Silence Removal Using AAL1, ATM Forum Technical Committee 95–1317, Oct. 2–6, 1995.*

Babiarz, "Education Module For Voice And Telephony Over", ATM Forum Technical Committee, 95–1255, Oct. 1–6, 1995.*

Noah, Terms Of Reference For A Variable Rate (4–13 KBPS) Voice Compression Algorithm, ATM Forum Technical Committee 95–1127, Oct. 2–6, 1995.*

Caves, "ATM Trunking: Network Delay And Echo Control Issues", ATM Forum Technical Committee 95–1135, Oct. 2–6, 1995.*

Noah, "Voice Compression Alorithms For ATM", ATM Forum Technical Committee 95–1063R1, Oct. 2–6, 1995.*

ITU Draft Recommendation I.363.1, B–IDSN ATM Adaptation Layer (AAL) Specification, Types 1 & 2, Jul. 21, 1995.*

* cited by examiner

| CELL BYTE | 40 KBP/S ADPCM (5 BITS) 3/2 | 32 KBP/S ADPCM (4 BITS) 2/1 | 24 KBP/S ADPCM (3 BITS) 5/2 | 16 KBP/S ADPCM (2 BITS) 4/1 |
|---|---|---|---|---|
| 2 | XXXXX XXX | XXXX XXXX | XXX XXX XX | XX XX XX XX |
| 3 | XX XXXXXO | XXXX XXXX | X XXX XXXO | XX XX XX XX |
| 4 | XXXXX XXX | XXXX XXXX | XXX XXX XX | XX XX XX XX |
| 5 | XX XXXXXO | XXXX XXXX | X XXX XXXO | XX XX XX XX |
| 6 | XXXXX XXX | XXXX XXXX | XXX XXX XX | XX XX XX XX |
| 7 | XX XXXXXO | XXXX XXXX | X XXX XXXO | XX XX XX XX |
| 8 | XXXXX XXX | XXXX XXXX | XXX XXX XX | XX XX XX XX |
| 9 | XX XXXXXO | XXXX XXXX | X XXX XXXO | XX XX XX XX |
| 10 | XXXXX XXX | XXXX XXXX | XXX XXX XX | XX XX XX XX |
| 11 | XX XXXXXO | XXXX XXXX | X XXX XXXO | XX XX XX XX |
| 12 | XXXXX XXX | XXXX XXXX | XXX XXX XX | XX XX XX XX |
| 13 | XX XXXXXO | XXXX XXXX | X XXX XXXO | XX XX XX XX |
| 14 | XXXXX XXX | XXXX XXXX | XXX XXX XX | XX XX XX XX |
| 15 | XX XXXXXO | XXXX XXXX | X XXX XXXO | XX XX XX XX |
| 16 | XXXXX XXX | XXXX XXXX | XXX XXX XX | XX XX XX XX |
| 17 | XX XXXXXO | XXXX XXXX | X XXX XXXO | XX XX XX XX |
| 18 | XXXXX XXX | XXXX XXXX | XXX XXX XX | XX XX XX XX |
| 19 | XX XXXXXO | XXXX XXXX | X XXX XXXO | XX XX XX XX |
| 20 | XXXXX XXX | XXXX XXXX | XXX XXX XX | XX XX XX XX |
| 21 | XX XXXXXO | XXXX XXXX | X XXX XXXO | XX XX XX XX |
| 22 | XXXXX XXX | XXXX XXXX | XXX XXX XX | XX XX XX XX |
| 23 | XX XXXXXO | XXXX XXXX | X XXX XXXO | XX XX XX XX |
| 24 | XXXXX XXX | XXXX XXXX | XXX XXX XX | XX XX XX XX |
| 25 | XX XXXXXO | XXXX XXXX | X XXX XXXO | XX XX XX XX |
| 26 | XXXXX XXX | XXXX XXXX | XXX XXX XX | XX XX XX XX |
| 27 | XX XXXXXO | XXXX XXXX | X XXX XXXO | XX XX XX XX |
| 28 | XXXXX XXX | XXXX XXXX | XXX XXX XX | XX XX XX XX |
| 29 | XX XXXXXO | XXXX XXXX | X XXX XXXO | XX XX XX XX |
| 30 | XXXXX XXX | XXXX XXXX | XXX XXX XX | XX XX XX XX |
| 31 | XX XXXXXO | XXXX XXXX | X XXX XXXO | XX XX XX XX |
| 32 | XXXXX XXX | XXXX XXXX | XXX XXX XX | XX XX XX XX |
| 33 | XX XXXXXO | XXXX XXXX | X XXX XXXO | XX XX XX XX |
| 34 | XXXXX XXX | XXXX XXXX | XXX XXX XX | XX XX XX XX |
| 35 | XX XXXXXO | XXXX XXXX | X XXX XXXO | XX XX XX XX |
| 36 | XXXXX XXX | XXXX XXXX | XXX XXX XX | XX XX XX XX |
| 37 | XX XXXXXO | XXXX XXXX | X XXX XXXO | XX XX XX XX |
| 38 | XXXXX XXX | XXXX XXXX | XXX XXX XX | XX XX XX XX |
| 39 | XX XXXXXO | XXXX XXXX | X XXX XXXO | XX XX XX XX |
| 40 | XXXXX XXX | XXXX XXXX | XXX XXX XX | XX XX XX XX |
| 41 | XX XXXXXO | XXXX XXXX | X XXX XXXO | XX XX XX XX |
| 42 | XXXXX XXX | XXXX XXXX | XXX XXX XX | XX XX XX XX |
| 43 | XX XXXXXO | XXXX XXXX | X XXX XXXO | XX XX XX XX |
| 44 | XXXXX XXX | XXXX XXXX | XXX XXX XX | XX XX XX XX |
| 45 | XX XXXXXO | XXXX XXXX | X XXX XXXO | XX XX XX XX |
| 46 | XXXXX XXX | XXXX XXXX | XXX XXX XX | XX XX XX XX |
| 47 | XX XXXXXO | XXXX XXXX | X XXX XXXO | XX XX XX XX |
| 48 | XXXXX OOO | XXXX XXXX | XXX XXX OO | XX XX XX XX |
| BYTES COMPRESSED | 139 | 94 | 232 | 376 |
| PACK/UNPACK DELAY | 17.375 MSEC | 11.75 MSEC | 29 MSEC | 47 MSEC |
| END-TO-END DELAY | 34.75 MSEC | 29.5 MSEC | 58 MSEC | 94 MSEC |

*FIG. 4*

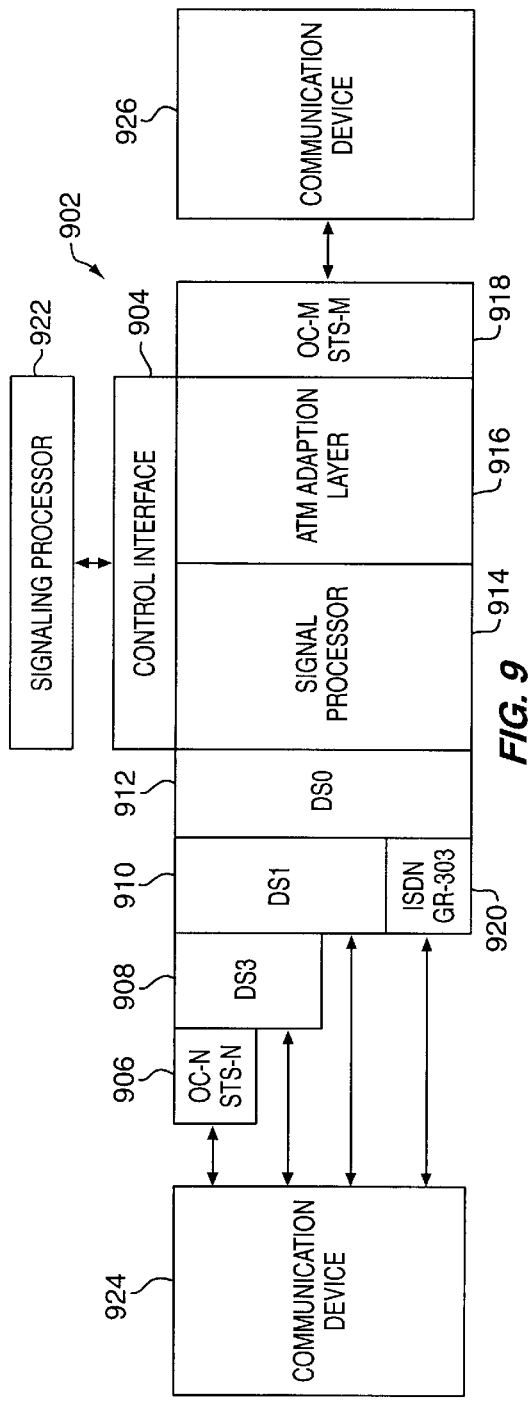
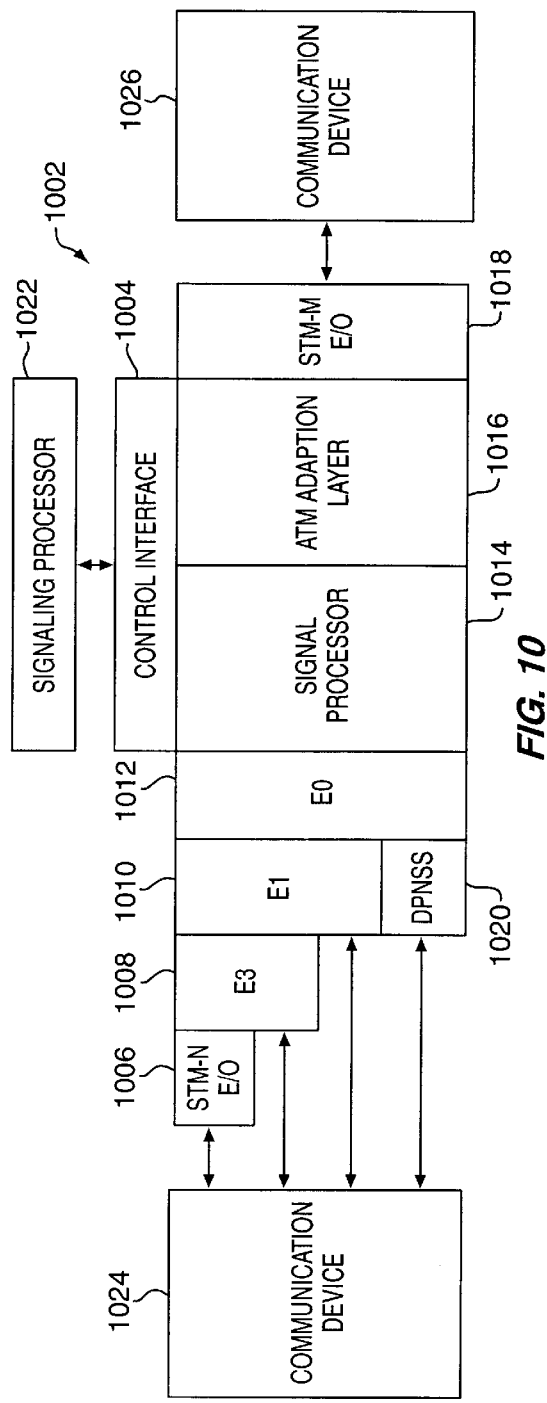

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/DATE |
|---|---|---|---|---|---|---|---|---|---|---|---|---|
| | | | | | | | | | | | | |
| | | | | | | | | | | | | |
| | | | | | | | | | | | | |

*FIG. 14*

| TRUNK GROUP NUMBER | GLARE RESOLUTION | CONTINUITY CONTROL | CLLI | SATELLITE TRUNK GROUP | SERVICE INDICATOR | ASSOCIATED NPA | SELECTION SEQUENCE | HOP COUNTER | ACC ACTIVE | OMI | NEXT FUNCTION | INDEX |
|---|---|---|---|---|---|---|---|---|---|---|---|---|
| | | | | | | | | | | | | |
| | | | | | | | | | | | | |
| | | | | | | | | | | | | |

*FIG. 15*

| EXCEPTION TABLE INDEX | CARRIER SELECTION IDENTIFICATION | CARRIER IDENTIFICATION | NATURE OF ADDRESS | CALLED PARTY | | NEXT FUNCTION | INDEX |
|---|---|---|---|---|---|---|---|
| | | | | DIGITS FROM | DIGITS TO | | |
| | | | | | | | |
| | | | | | | | |
| | | | | | | | |

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |
| | | | | | | | | |

FIG. 18

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 19

| ROUTING TABLE INDEX | TRANSIT NETWORK SELECTION | | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|---|
| | NETWORK IDENTIFICATION PLAN | DIGITS FROM | DIGITS TO | | | | | | | | |
| | | | | | | | | | | | |
| | | | | | | | | | | | |

FIG. 20

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 21*

SYSTEM AND METHOD FOR TRANSPORTING A CALL

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call transport and processing.

BACKGROUND OF THE INVENTION

Broadband systems are being developed and implemented. Broadband systems provide telecommunications providers with many benefits, including greater bandwidth, more efficient use of bandwidth, and the ability to integrate voice, data, and video communications. These broadband systems provide callers with increased capabilities at lower costs.

Techniques are used to transport calls in an efficient manner. Many of these techniques are encoding techniques that use compression methods to lower the bit rate at which the call is transported, in addition to encryption methods to secure calls.

A compact representation of the call that results in a lower bit rate can be considered to be a compressed call. Compression is achieved by removing redundant bits or bits that do not change in successive sampling intervals. Compression saves transmission time or capacity. Thus, a greater amount of information may be transported in a compressed-state over a selected connection or any other defined bandwidth.

In addition, encryption techniques are used to secure calls. Encryption is the transformation of information into a form that is unreadable unless it is decrypted. The purpose of encryption is to keep the information hidden from anyone for whom it is not intended.

There is a need for a system that more efficiently and securely transports a call through an asynchronous transfer mode system. There is a need for a system that efficiently compresses, encrypts, or other wise processes a call having a voiceband signal payload, and provides a mechanism to indicate when the call is compressed, encrypted, or otherwise processed. The system of the present invention fills that need.

SUMMARY OF THE INVENTION

The present invention comprises a system for transporting a call having user communications and call signaling. The system comprises a signaling processor and an interworking unit. The signaling processor is adapted to receive the call signaling and to process the call signaling to select a connection and to transport a control message that identifies the selected connection. The interworking unit is adapted to receive the user communications in a communication format and to receive the control message from the signaling processor. The interworking unit processes the user communications according to a processing option. The interworking unit interworks the user communications between the communication format and an asynchronous transfer mode format. The interworking unit sets a convergence sublayer indicator in the asynchronous transfer mode formatted user communications to indicate that the user communications are processed according to the processing option. Then, the interworking unit transports the processed user communications in the asynchronous transfer mode format over the selected connection.

Further, the present invention is a system for transporting a call having user communications and call signaling. The system comprises a first signaling processor, a first interworking unit, a second signaling processor, and a second interworking unit.

The first signaling processor is adapted to receive the call signaling and to process the call signaling to select a first connection. The first signaling processor transports a first control message that identifies the selected first connection and transports a second control message that identifies the selected first connection.

The first interworking unit is adapted to receive the user communications in a communication format and to receive the first control message from the first signaling processor. The first interworking unit processes the user communications according to a first processing option. The first interworking unit interworks the user communications between the first communication format and asynchronous transfer mode cells that identify the selected first connection. The first interworking unit sets an indicator in the asynchronous transfer mode cells to indicate that the user communications are processed according to the first processing option. The first interworking unit transports the asynchronous transfer mode cells over the selected first connection.

The second signaling processor is adapted to receive the second control message identifying the selected first connection. The second signaling processor processes the second control message to select a second connection and transports a third control message identifying the selected second connection.

The second interworking unit is adapted to receive the third control message from the second signaling processor and to receive the asynchronous transfer mode cells over the selected first connection from the first interworking unit. The second interworking unit interworks the asynchronous transfer mode cells according to a second processing option to convert the asynchronous transfer mode cells to user communications having a second communication format if the indicator is set. The second interworking unit transports the user communications over the selected second connection in the second communication format.

In another aspect, the present invention is a system for transporting a call having voiceband user communications. The system comprises a first interworking unit and a second interworking unit. The first interworking unit is adapted to receive the voiceband user communications in a first communication format. The first interworking unit processes the voiceband user communications according to a first processing option and converts the user communications to asynchronous transfer mode cells that identify a selected connection. The first interworking unit sets a convergence sublayer indicator bit in the asynchronous transfer mode cells to identify that the voiceband user communications have been processed according to the first processing option. The first interworking unit then transports the asynchronous transfer mode cells over the selected connection.

The second interworking unit is adapted to receive the asynchronous transfer mode cells over the selected connection and to identify the convergence sublayer indicator bit. The second interworking unit interworks the asynchronous transfer mode cells according to a second processing option to convert the asynchronous transfer mode cells to voiceband user communications having a second communication format if the convergence sublayer indicator bit is set.

In still another aspect, the present invention is a system for transporting a call having voiceband user communications. The system comprises a first communication device that is adapted to transport the voiceband user communications in a first communication format. The system further comprises a first interworking unit and a second interworking unit.

The first interworking unit is adapted to receive the voiceband user communications from the first communication device and to compress the voiceband user communications according to a selected compression method. The first interworking unit converts the user communications to asynchronous transfer mode cells that identify a selected connection. The first interworking unit sets a convergence sublayer indicator bit in the asynchronous transfer mode cells to indicate that the voiceband user communications have been compressed. The first interworking unit transports the asynchronous transfer mode cells over the selected connection.

The second interworking unit is adapted to receive the asynchronous transfer mode cells from the first interworking unit over the selected connection. The second interworking unit identifies the convergence sublayer indicator bit and converts the asynchronous transfer mode cells to the voiceband user communications with a second communication format according to a selected decompression method if the convergence sublayer indicator bit is set. The second interworking unit transports the decompressed voiceband user communications in the second communication format.

The system further comprises a second communication device that is adapted to receive the decompressed voiceband user communications from the second interworking unit.

In yet another aspect, the present invention is a method for transporting a call having voiceband user communications through an asynchronous transfer mode system. The voiceband user communications have a first communication format. The method comprises processing the voiceband user communications with a first processing option. The processed voiceband user communications are interworked from the first communication format to asynchronous transfer mode cells that identify a selected connection. An indicator is set in the asynchronous transfer mode cells to indicate that the voiceband user communications have been processed with the first processing option. The asynchronous transfer mode cells are transported on the selected connection. The asynchronous transfer mode cells are received and the indicator is examined to determine if the indicator is set. The asynchronous transfer mode cells are interworked to the voiceband user communications with a second communication format according to a second processing option if the indicator is set.

Further, the present invention is a method for transporting a call through an asynchronous transfer mode system. The call has voiceband user communications. The method comprises processing the voiceband user communications with a first processing option. An indicator is set in an asynchronous transfer mode cell, and the asynchronous transfer mode cell is filled with processed voice user communications. The asynchronous transfer mode cell identifies a selected connection. The asynchronous transfer mode cell is transported over the selected connection. The method further comprises receiving the asynchronous transfer mode cell and processing the asynchronous transfer mode cell according to a second processing option if the indicator is set.

Still further, the present invention comprises a method for transporting a call through an asynchronous transfer mode system. The call has voiceband user communications located in an asynchronous transfer mode cell. The method comprises setting a convergence sublayer indicator bit in the asynchronous transfer mode cell if the voiceband user communications are processed with a selected compression method. The asynchronous transfer mode cell is transported. The method further comprises processing the asynchronous transfer mode cell with a selected decompression method to voiceband user communications in a communication format if the convergence sublayer indicator bit in the asynchronous transfer mode cell is set.

In another aspect, the present invention comprises a method for transporting a call through an asynchronous transfer mode system. The call has voiceband user communications and call signaling. The method comprises processing the call signaling in a first signaling processor to select a connection and transmitting a control message from the first signaling processor identifying the selected connection. The method further comprises receiving the control message and the voiceband user communications in a first interworking unit and processing the voiceband user communications with a first processing option in the first interworking unit. An indicator is set in an asynchronous transfer mode cell, the cell is filled with processed voiceband user communications, and the cell is transported over the selected connection from the first interworking unit. The cell is received in a second interworking unit and processed in the second interworking unit according to a second processing option if the indicator is set.

The present invention further comprises a system for transporting a call having voiceband user communications through an asynchronous transfer mode system. The system comprises a first communication device that is adapted to transport the call in a communication format and a second communication device that is adapted to receive the call. A first signaling processor is included to transport a first control message identifying a selected compression method and a selected first connection and to transport a second control message identifying the selected compression method. The system includes a first interworking unit that is adapted to receive the voiceband user communications from the first communication device and to receive the first control message from the first signaling processor. The first interworking unit compresses the voiceband user communications according to the selected compression method identified in the control message. The first interworking unit converts the compressed voiceband user communications to asynchronous transfer mode cells that identify the selected first connection and transports the asynchronous transfer mode cells on the selected first connection.

The system further comprises a second signaling processor that is adapted to receive and process the second control message and, in response thereto, to transport a third control message identifying a selected decompression method and a selected third connection. A second interworking unit is included in the system, and it is adapted to receive the asynchronous transfer mode cells from the first interworking unit and to receive the third control message from the second signaling processor. The second interworking unit converts the asynchronous transfer mode cells according to the selected decompression method identified in the third control message to the voiceband user communications in a format processable by the second communication device. The second interworking unit transports the user communications to the second communication device.

In still another aspect, the present invention comprises a system for transporting a call having voiceband user communications. The system comprises a signaling processor that is adapted to transport a control message that identifies a compression method and a selected connection. The system further comprises an interworking unit that is adapted to receive the voiceband user communications in a pulse code modulation format and to receive the control message from the signaling processor. The interworking unit compresses the voiceband user communications according to the identified compression method. The interworking unit interworks the compressed voiceband user communications between an asynchronous transfer mode format and the pulse code modulation format and transports the compressed voiceband user communications in the asynchronous transfer mode format over the selected connection.

BRIEF DESCRIPTION OF THE DRAWINGS

FIG. 4 is a table illustrating compression coding methods.

FIG. 9 is a functional diagram of an asynchronous transfer mode interworking unit for use with a synchronous optical network system in accordance with the present invention.

FIG. 10 is a functional diagram of an asynchronous transfer mode interworking unit for use with a synchronous digital hierarchy system in accordance with the present invention.

FIG. 14 is a table diagram of a trunk circuit table used in the signaling processor of FIG. 13.

FIG. 15 is a table diagram of a trunk group table used in the signaling processor of FIG. 13.

FIG. 16 is a table diagram of an exception circuit table used in the signaling processor of FIG. 13.

FIG. 17 is a table diagram of an automated number index table used in the signaling processor of FIG. 13.

FIG. 18 is a table diagram of a called number table used in the signaling processor of FIG. 13.

FIG. 19 is a table diagram of a routing table used in the signaling processor of FIG. 13.

FIG. 20 is a table diagram of a treatment table used in the signaling processor of FIG. 13.

FIG. 21 is a table diagram of a message table used in the signaling processor of FIG. 13.

DETAILED DESCRIPTION

Figure 1:
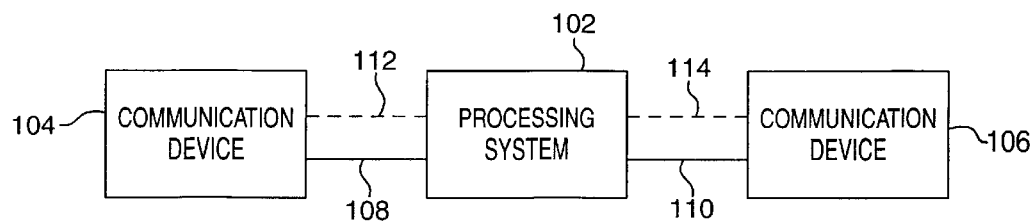
FIG. 1 is a block diagram of a compression system operating out-of-band with a first communication device and a second communication device.

Telecommunication systems have a number of communication devices in local exchange and interexchange environments that interact to provide call services to customers. Both traditional services and resources and intelligent network (IN) services and resources are used to process, route, or connect a call to a designated connection.

A call has call signaling and user communications. The user communications contain the caller's information, such as a voice communication or data communication, and they are communicated over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.933.

A call can be transported to or from a communication device. A communication device can be, for example, customer premises equipment (CPE), a service platform, a switch, or any other device capable of initiating, handling, or terminating a call. Customer premises equipment can be, for example, a telephone, a computer, a facsimile machine, or a private branch exchange. A service platform can be, for example, a service platform or any other enhanced platform that is capable of processing calls.

Communications devices in both traditional and intelligent systems can use a variety of protocols and methods to achieve a connection for a call or to complete call processing. For example, CPE can be connected to a switch using a time division multiplex (TDM) format, such as super frame (SF) or extended superframe (ESF). The ESF connection allows multiple devices at the customer site to access the local switch and obtain telecommunication services.

Also, communication devices, such as telephones, are likely connected to a remote digital terminal, and the connection typically carries analog signals over twisted pair wires. The remote digital terminals provide a digital interface between the telephones and a local switch by converting the analog signals from the telephones into a multiplexed digital signal to be transferred to the local switch. A common standard for the connection between the remote digital terminal and the local switch is provided in Bellcore Reference GR-TSY-000303 (GR-303).

In addition, communications devices use broadband protocols, such as broadband-integrated services digital network (B-ISDN). Broadband systems provide greater bandwidth than narrowband systems for calls, in addition to providing digital processing of the calls. B-ISDN provides a communication device with a digital connection to a local switch or other device. The B-ISDN loop provides more bandwidth and control than a convention local loop. The European implementation of B-ISDN and other broadband protocols can also be used.

Communication devices use circuit-based connections for calls. For example, digital signal (DS) level communications, such as digital signal level 3 (DS3), digital signal level one (DS1), and digital signal level zero (DS0) are conventional circuit-based connections. European level four (E4), European level three (E3), European level one (E1), European level zero (E0), and other European equivalent circuit-based connections, also are used.

High speed electrical/optical transmission protocols also are used by communication devices for switching and signaling. The synchronous optical network (SONET) protocol, which is used primarily in North America, and the synchronous digital hierarchy (SDH) protocol, which is used primarily in Europe, are examples of high speed electrical/optical protocols. The SONET and SDH protocols describe the physical media and transmission protocols through which the communications take place.

SONET includes optical transmission of optical carrier (OC) signals and electrical transmission of synchronous transport signals (STSs). SONET signals transmit at a base rate of 51.84 Mega-bits per second (Mbps) for optical carrier level one (OC-1) and synchronous transport signal level one (STS-1). Also transmitted are multiples thereof, such as an STS level three (STS-3) and an OC level three (OC-3) at rates of 155.52 Mbps and an STS level twelve (STS-12) and an OC level 12 (OC-12) at rates of 622.08 Mbps, and fractions thereof, such as a virtual tributary group (VTG) at a rate of 6.912 Mbps.

SDH includes transmission of optical synchronous transport module (STM O) signals and electrical synchronous transport module (STM E) signals. SDH signals transmit at a base rate of 155.52 Mbps for synchronous transport module level one electrical and optical (STM-1 E/O). Also transmitted are multiples thereof, such as an STM level four electrical/optical (STM-4 E/O) at rates of 622.08 Mbps, and fractions thereof, such as a tributary unit group (TUG) at a rate of 6.912 Mbps.

Asynchronous transfer mode (ATM) is one technology that is being used in conjunction with SONET and SDH to provide broadband call switching and call transport for telecommunication services. ATM is a protocol that describes communication of user communications in ATM cells. Because the protocol uses cells, calls can be transported on demand for connection-oriented traffic or connectionless-oriented traffic, constant-bit traffic or variable-bit traffic, and between equipment that either requires timing or does not require timing.

ATM systems handle calls over switched virtual paths (SVPs) and switched virtual circuits (SVCs). The virtual nature of ATM allows multiple communication devices to use a physical communication line at different times. This type of virtual connection more efficiently uses bandwidth, and thereby provides more cost efficient transport for customer calls, than permanent virtual circuits (PVCs) or other dedicated circuits.

The ATM system is able to connect a caller from an origination point to a destination point by selecting a connection from the origination point to the destination point. The connection contains a virtual path (VP) and a virtual channel (VC). A VC is a logical connection between two end points for the transfer of ATM cells. A VP is a logical combination of VCs. The ATM system designates the selected connection by specifying a virtual path identifier (VPI) that identifies the selected VP and a virtual channel identifier (VCI) that identifies the selected VC within the selected VP. Because many ATM connections are unidirectional, bidirectional communications in an ATM system usually require companion VPIs/VCIs.

The system of the present invention uses compression to lower the bit rate of a call. In addition, the system may encrypt the user communications to more securely transport them. The system uses an indicator to identify when a call has been compressed or encrypted.

FIG. 1 illustrates a system that processes a call to provide encryption, compression, or encryption and compression in accordance with the present invention. The processing system 102 of FIG. 1 is connected to a first communication device 104 and a second communication device 106. It will be appreciated that other communication devices and elements may be included. However, the number of communication devices shown has been restricted for clarity.

The processing system 102 is connected to the first communication device 104 by a connection 108 and to the second communication device 106 by a connection 110. The processing system 102 is linked to the first communication device 104 by a link 112 and to the second communication device 106 by a link 114.

Connections are used to transport user communications and other device information between communication devices and between the elements and devices of the processing system 102. The term "connection" as used herein means the transmission media used to carry user communications between the first and second communication devices 104 and 106 and the processing system 102 or between the elements of the processing system 102. For example, a connection could carry a user's voice, computer data, or other communication device data. A connection can be associated with either inband communications or out-of-band communications.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as SS7, C7, ISDN, B-ISDN, GR-303, local area network (LAN), or data bus call signaling. A link can be, for example, an AAL5 data link, UDP/IP, ethernet, or DS0 over T1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

The processing system 102 of FIG. 1 processes out-of-band call signaling and user communications for calls. The processing system 102 compresses or encrypts the user communications for voiceband payloads, transports the user communications over a distance, and decompresses or de-encrypts the user communications. The processing system 102 also may compress and encrypt the user communications. These compressed and encrypted user communications are later decompressed and de-encrypted by the processing system 102.

The first and second communication devices 104 and 106 each comprise CPE, a service platform, a switch, a remote digital terminal, or any other device capable of initiating, handling, or terminating a call. CPE can be, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303.

The system of FIG. 1 operates as follows. The first communication device 104 transmits call signaling and voiceband user communications to the processing system 102 in a communication format, such as pulse code modulation (PCM). The processing system 102 processes the call signaling to determine where the call is destined and to identify a processing option, such as a compression method, an encryption method, or a compression method and an encryption method, with which to process the user communications.

The processing system 102 processes the user communications according to the identified processing option so that they are in a compressed, encrypted, or compressed and encrypted form. The processing system 102 places the processed user communications in the ATM format and transports the processed user communications through the ATM network (not shown). After transporting the user communications across the ATM network, the processing system 102 processes the user communications according to a processing option, such as a decompression method, a de-encryption method, or a decompression method and a de-encryption method, to place the user communications back in the communication format, such as the PCM format. The processing system 102 then transports the voiceband user communications to a termination point or a handling point, such as the second communication device 106.

Figure 2:
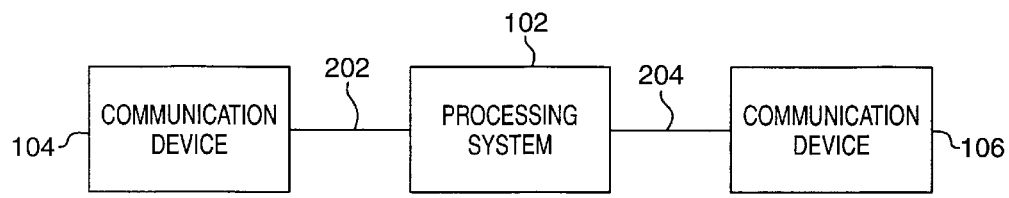
FIG. 2 is a block diagram of a compression system operating in-band with a first communication device and second a communication device.

As illustrated in FIG. 2, the processing system 102 also processes in-band call signaling and user communications. The system of FIG. 2 operates the same as the system illustrated in FIG. 1, except that call signaling is processed as in-band call signaling rather than out-of-band call signaling. Thus, the processing system 102 processes, for example, calls transported on ESF and SF circuits.

Referring now to FIG. 1 and FIG. 2, the processing system 102 uses an encoding law, such as A-law or u-law, to code analog signals to digital signals. PCM and adaptive differential pulse code modulation (ADPCM) are two methods of digitizing or quantizing an analog signal to convert the signal to a digital signal. Thus, PCM and ADPCM formats are communication formats in which calls are transported. A-law and u-law are non-linear encoding laws that are used in the analog-to-digital (A/D) and digital-to-analog (D/A) conversions. A-law is used primarily in Europe, while u-law is used primarily in North America and Japan.

The processing system 102 processes calls for voiceband signal payloads. Thus, the processing system 102 supports constant bit, time-dependent traffic in an ATM system. An ATM protocol known as ATM adaptation layer (AAL) designates how the user communications are routed and handled. For example, the AAL performs cell adaptations between ATM interfaces and non-ATM interfaces and transmission error processing. ATM adaptation layer 1 (AAL1) is the protocol type for connection-oriented, constant bit-rate user communications with a timing relationship. AAL1 designates the protocol for the functions and services used for ATM cells having voiceband-type payloads that are processed by the processing system 102 of the present invention.

The processing system 102 uses an indicator to identify whether the user communications are compressed or encrypted or whether the user communications are not compressed and not encrypted. Because some data protocols can not be processed using certain processing options, the indicator is used to identify which user communications have been processed and which have not been processed. For example, it may not be desirable to process voiceband modem, facsimile, or compressed user communications with a compression method. Therefore, the processing system 102 would not process such user communications with compression, and the indicator would indicate that the user communications were not so processed.

The indicator is transported from an initiating point or handling point in the processing system 102 to a terminating point or a handling point in the processing system with the user communications or associated call signaling. Preferably, the processing system 102 uses a convergence sublayer indicator (CSI) bit in an ATM cell for AAL1-type calls as an indicator when transporting user communications in the ATM format.

Figure 3:
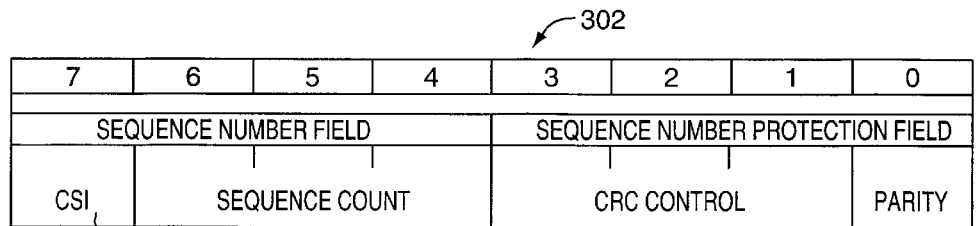
FIG. 3 is a relational diagram of the first octet of an asynchronous transfer mode cell for asynchronous transfer mode adaptation layer one.

FIG. 3 illustrates the first octet 302 of an ATM cell for AAL1. Bits 0–3 contain the sequence number protection (SNP) field, of which bit 0 is a parity bit, and bits 1–3 are for a cyclic redundancy check (CRC) control. Bits 4–7 are a sequence number (SN) field, of which bits 4–6 are a sequence count, and bit 7 is a CSI bit 304.

The SNP field is used for error correction to protect the SN field from errors. The parity bit within the SNP field denotes whether the sequence count and CSI subfields are even parity. The CRC control is an error check used to make sure data is received correctly.

The SN field is used to inspect whether a cell loss or a cell insertion has occurred. The sequence count contains a binary encoded sequence counter that is passed between peer AAL1-convergence sublayer entities. The CSI bit 304 may be used for special purposes, such as indicating the presence of a convergence sublayer function. Convergence sublayer functions typically involve error correction for video or audio signals. In addition, the convergence sublayer functions include clock recovery, timing functions, and sequence number processing.

The processing system 102 may be configured to use a variety of compression methods or encryption methods. For example, FIG. 4 illustrates a byte packing scheme for ADPCM compression. The standard transmission rate of a typical voiceband call is 64 kilo-bytes per second (kbp/s). FIG. 4 illustrates coding schemes for four compression methods, including 40 kbp/s for a 3/2 compression, 32 kbp/s for a 2/1 compression, 24 kbp/s for a 5/2 compression, and 16 kbp/s for a 4/1 compression. In addition, FIG. 4 illustrates, for each coding scheme, the respective number of bytes being compressed or decompressed, the cell pack or unpack delay, and the end-to-end delay due to packing and unpacking the cells. It will be appreciated that the compression methods illustrated in FIG. 4 are examples, and that other compression methods using other compression coding schemes may be used.

Referring to FIGS. 1–3, the processing system 102 uses the CSI bit 304 to indicate whether the user communications have been compressed, encrypted, or otherwise processed or whether the user communications have been left uncompressed, un-encrypted, or otherwise unprocessed. When the processing system 102 compresses or encrypts the user communications, the processing system sets the CSI bit 304 to a one. If the processing system 102 does not compress or encrypt the user communications, the processing system leaves the CSI bit 304 unset or reset at zero.

The processing system 102 may be configured to set the CSI bit 304 for four processing options. First, the processing system 102 may be configured to set the CSI bit 304 to one only when the user communications are compressed. Second, the processing system 102 may be configured to set the CSI bit 304 to one only when the user communications are encrypted. Third, the processing system 102 may be configured to set the CSI bit 304 to one when the user communications are either compressed or encrypted. Fourth, the processing system 102 may be configured to set the CSI bit 304 to one when the user communications both are compressed and encrypted.

It will be appreciated that the CSI bit 304 may be set to one for other combinations or variations of compression and encryption configurations. In addition, the CSI bit 304 may be set as an indicator to indicate that the user communications have been processed with another processing option.

Figure 5:
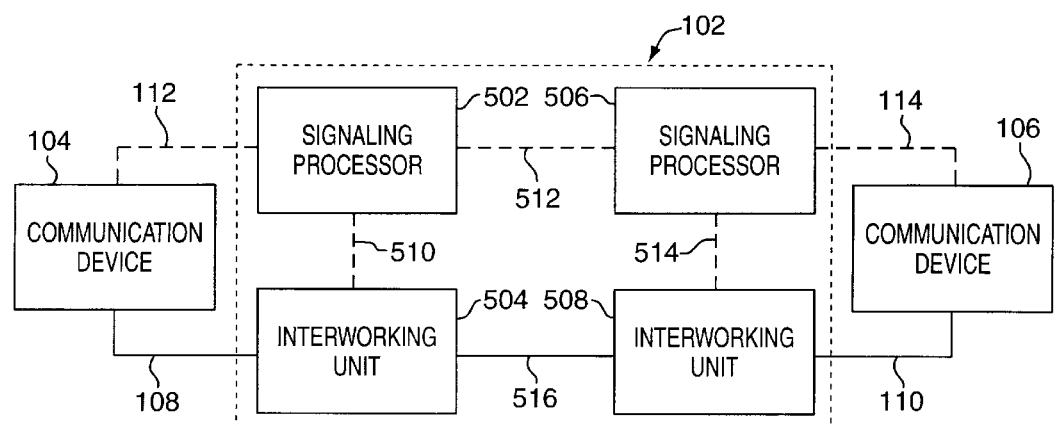
FIG. 5 is a block diagram of an expansion of the system of the present invention operating out-of-band.

FIG. 5 illustrates components of the processing system 102 as the processing system operates to process out-of-band call signaling. The processing system 102 has a first signaling processor 502, a first interworking unit 504, a second signaling processor 506, and a second interworking unit 508. The processing system 102 interacts with the first communication device 104 and the second communication device 106.

A series of links and connections link the elements of the processing system 102. The first signaling processor 502 is linked to the first interworking unit 504 through a link 510 and to the second signaling processor 506 through a link 512. The second signaling processor 506 is linked to the second interworking unit 508 through a link 514. The first interworking unit 504 is connected to the second interworking unit 508 through a connection 516.

In addition, the links 112 and 114 from the first communication device 104 and the second communication device 106 link to the first signaling processor 502 and the second signaling processor 506, respectively. Also, the connections 108 and 110 from the first communication device 104 and the second communication device 106 connect to the first interworking unit 504 and the second interworking unit 508, respectively.

Referring again to FIG. 5, the processing system 102 may process broadband integrated services user part (BISUP) signaling, narrowband integrated services user part (NISUP) signaling, or a combination of the BISUP and NISUP. BISUP and NISUP are SS7 protocols which define the signaling messages to control connections and services. Thus, the signaling links 112, 512, and 114 may carry NISUP, NISUP, and NISUP; NISUP, BISUP, and NISUP; NISUP, NISUP, and BISUP; NISUP, BISUP, and BISUP; BISUP, BISUP, and BISUP; BISUP, BISUP, and NISUP; BISUP, NISUP, and NISUP; and BISUP, NISUP, and BISUP, respectively. In addition, the signaling links 112, 512, and 114 may be NISUP, BISUP, and NISUP. It will be appreciated that the signaling links 112, 512, and 114 may carry analogous C7 messages or other appropriate call signaling.

The first signaling processor 502 is a signaling platform that can receive and process signaling. Based on the processed signaling, the first signaling processor 502 selects processing options for the user communications, such as a compression method, an encryption method, or a compression method and an encryption method, and generates and transports control messages that identify the communication device, processing option, service, or resource that is to be used. The first signaling processor 502 also selects virtual connections and circuit-based connections for call routing and generates and transports control messages that identify the selected connection. The first signaling processor 502 can process various forms of signaling, including ISDN, SS7, and C7. A preferred signaling processor is discussed below.

The first interworking unit 504 interworks traffic between various protocols. Preferably, the first interworking unit 504 interworks between ATM traffic and non-ATM traffic. The first interworking unit 504 operates in accordance with control messages received from the first signaling processor 502 over the link 510. These control messages are typically provided on a call-by-call basis and typically identify an assignment between a DS0 and a VPI/VCI for which user communications are interworked.

In a first configuration, the first interworking unit 504 is configured to implement processing options as dynamically instructed in the control messages from the first signaling processor 502. For example, the first interworking unit may provide echo cancellation, encryption, or compression to the user communications. Thus, the first signaling processor 502 dynamically loads control messages in real-time to the first interworking unit 504 to identify whether compression, encryption, or compression and encryption are to be applied, if at all, to the user communications for a selected connection and the method for applying the compression, encryption, or compression and encryption. In addition, the first signaling processor 502 dynamically loads control messages in realtime to the first interworking unit 504 to identify whether decompression, de-encryption, or decompression and de-encryption are to be applied, if at all, to the user communications for a selected connection and the method for applying the decompression, de-encryption, or decompression and de-encryption.

In another configuration, the first interworking unit 504 is configured with static lookup tables. The first interworking unit 504 uses the static lookup tables to determine which compression method, encryption method, or compression method and encryption method is to be applied, if at all, to the user communications. Thus, the first interworking unit 504 will apply a particular compression method or encryption method for a particular VPI/VCI connection over which user communication are transported. In addition, the first interworking unit 504 will apply a particular decompression method, de-encryption method, or decompression method and de-encryption method for a particular VPI/VCI connection from which user communication are received. A preferred interworking unit is discussed below.

The second signaling processor 506 is a signaling platform that can receive and process signaling. Based on the processed signaling, the second signaling processor 506 selects processing options for the user communications, such as a compression method or an encryption method, and generates and transports control messages that identify the communication device, processing option, service, or resource that is to be used. The second signaling processor 506 also selects virtual connections and circuit-based connections for call routing and generates and transports control messages that identify the selected connection. The second signaling processor 506 can process various forms of signaling, including ISDN, SS7, and C7. A preferred signaling processor is discussed below.

The second interworking unit 508 interworks traffic between various protocols. Preferably, the second interworking unit 508 interworks between ATM traffic and non-ATM traffic. The second interworking unit 508 operates in accordance with control messages received from the second signaling processor 506 over the link 514. These control messages are typically provided on a call-by-call basis and typically identify an assignment between a DS0 and a VPI/VCI for which user communications are interworked.

In a first configuration, the second interworking unit 508 is configured to implement processing options as dynamically instructed in the control messages from the second signaling processor 506. For example, the second interworking unit 508 may provide echo cancellation, encryption, or compression to the user communications. Thus, the second signaling processor 506 dynamically loads control messages in real-time to the second interworking unit 508 to identify whether compression, encryption, or compression and encryption are to be applied, if at all, to the user communications for a selected connection and the method for applying the compression, encryption, or compression and encryption. In addition, the second signaling processor 506 dynamically loads control messages in real-time to the second interworking unit 508 to identify whether decompression, de-encryption, or decompression and de-encryption are to be applied, if at all, to the user communications for a selected connection and the method for applying the decompression, de-encryption, or decompression and de-encryption.

In another configuration, the second interworking unit 508 is configured with static lookup tables. The second interworking unit 508 uses the static lookup tables to determine which compression method, encryption method, or compression method and encryption method is to be applied, if at all, to the user communications. Thus, the second interworking unit 508 will apply a particular compression method or encryption method for a particular VPI/VCI connection over which user communication are transported. In addition, the second interworking unit 508 will apply a particular decompression method, de-encryption method, or decompression method and de-encryption method for a particular VPI/VCI connection from which user communication are received. A preferred interworking unit is discussed below.

The process system 102 of FIG. 5 operates as follows when the first and second signaling processors 502 and 506 dynamically load control messages identifying processing options, such as compression or encryption methods and decompression or de-encryption methods to the first and second interworking units 504 and 508, respectively. The first communication device 104 transports call signaling over the link 112 to the first signaling processor 502. The first communication device 104 also transports user communications to the first interworking unit 504 over the connection 108. Typically, the call is transported in a communication format, such as the 64 kbp/s PCM format.

The first signaling processor 502 processes the call signaling and determines that the user communications are to be processed with a processing option, such as a compression method. The first signaling processor 502 also selects a first connection 516 for the call over which the user communications will be transported. The first signaling processor 502 transports a control message to the second signaling processor 506 designating the compression method and the selected first connection 516. If the processing system 102 is processing SS7 messages, the control message sent by the first signaling processor 502 to the second signaling processor is an SS7 initial address message (IAM). The IAM uses a generic digit parameter using a binary encoding scheme and a digits field encoded with a network specific value that identifies a selected compression method.

The first signaling processor 502 also transports a control message to the first interworking unit 504 designating the compression method and the selected first connection 516. It will be appreciated that an encryption method may be used in addition to, or in place of, the compression method to process the user communications.

The second signaling processor 506 receives the control message from the first signaling processor 502 and processes it. The second signaling processor 506 determines, from the control message, that the user communications will be received by the second interworking unit 508, and that the user communications are compressed according to the selected compression method. The second signaling processor 506 selects a processing option to process the user communications at the second interworking unit 508, such as a decompression method to decompress the user communications, and a second connection 110 over which the user communications are to be transported. The second signaling processor 506 transports a control message to the second interworking unit 508 designating the decompression method and the selected second connection 110 over which to transport the user communications.

The first interworking unit 504 receives the control message from the first signaling processor 502. The control message designates the selected first connection 516 and the selected compression method. The selected first connection 516 is an ATM VPI/VCI connection. Therefore, the first interworking unit 504 interworks between the format received from the connection 108 to the ATM format for ATM cells that identify the selected first connection 516. Generally, the user communications are voiceband user communications that are received in the PCM or ADPCM format from a circuit-based connection at 64 kbp/s.

Referring to FIG. 3 and FIG. 5, the first interworking unit 504 compresses the user communications according to the selected compression method and interworks the compressed user communications. The first interworking unit 504 sets the CSI bit 304 in the first octet of an ATM cell to one and recalculates and inserts in the first octet 302 the CRC, the parity, and the sequence count. The first interworking unit 504 then fills the remaining forty-seven bytes of the ATM cell with the compressed user communications and transports the ATM cell over the selected first connection 516. The first interworking unit 504 performs the interworking for all of the user communications.

The second interworking unit 508 receives the control message from the second signaling processor 506 and the ATM cells containing the compressed user communications from the first interworking unit 504. The second interworking unit 508 examines the CSI bit 304 in the first octet of the ATM cell to determine whether or not it is set to one. Because the CSI bit 304 is set to one, the second interworking unit 508 processes the remaining bytes in the ATM cell with a processing option identified in the control message from the second signaling processor 506. The second interworking unit 508 processes the user communications with the identified decompression method.

To process the user communications, the second interworking unit 508 interworks the user communications according to the identified decompression method. This involves extracting the correct number of bits from the ATM cell, depending on which compression method was used by the first interworking unit 504 and which decompression method was chosen by the second signaling processor 506. For example, if the user communications were compressed to 32 kbp/s, four bits per byte are extracted. The second interworking unit 508 then decompresses the user communications according to the selected decompression method and transports the voiceband user communications over the selected second connection 110 in a communication format to the second communication device 106. Generally, the user communications transported over the selected second connection 110 are voiceband user communications that are transported in the PCM or ADPCM format over a circuit-based connection at 64 kbp/s.

The first signaling processor 502 may terminate the user communications compression by transporting a control message to the first interworking unit 504 instructing the first interworking unit to stop using the selected compression method and to transport the user communications in the uncompressed state. The first interworking unit 504 completes the current cell then resets the CSI bit 304 to zero for the next cell, and transports the user communications in the uncompressed state in the ATM cells that identify the selected connection 516.

Referring still to FIG. 3 and FIG. 5, the second interworking unit 508 receives the ATM cells over the selected connection 516. When the second interworking unit 508 examines the CSI bit 304, it determines that the CSI bit is set to zero. Therefore, the second interworking unit 508 processes the ATM cell as uncompressed user communications on a cell-by-cell basis. After the user communications are interworked, they are transported over the selected second connection 1 10 to the second communication device 106.

When the call is complete, either the first communication device 104 or the second communication device 106 may initiate a disconnect. The first or second communication device 104 or 106 sends a signaling message to the respective first or second signaling processor 502 or 506 requesting the disconnect. The first or second signaling processor 502 or 506 then signals the other signaling processor, and each of the first and second signaling processors 502 and 506 send a disconnect control message to the respective first and second interworking units 504 and 508.

It will be appreciated that the processing system 102 of FIG. 5 also may operate to transport a call from the second communication device 106 to the first communication device 104. The call may be processed with a processing option.

In such a case, the processing system 102 operates in the reverse of the operation as described above so that the second signaling processor 506 processes the call signaling to select a connection 516. The second signaling processor 506 may also select a processing option. The second signaling processor 506 transports a control message to the second interworking unit 508 identifying a selected connection 516 and, in some instances, a processing option.

The second interworking unit 508 receives the control message from the second signaling processor 506 and the voiceband user communications from the second communication device 106. The second interworking unit 508 processes the user communications with a processing option, such as a compression method. The second interworking unit 508 interworks the user communications to ATM cells that identify the selected connection 516, including setting the CSI bit 304 and filling the ATM cells. The second interworking unit 508 then transports the ATM cells over the connection 516.

The first signaling processor 502 receives a control message from the second interworking unit 506 identifying the selected connection 516 and, if selected, the processing option. The first signaling processor 502 processes the control message to select a connection 108 to the first communication device 104 and transmits a control message to the first interworking unit 504 identifying the connection and, if applicable, a processing option, such as a decompression method.

The first interworking unit 504 receives the control message from the first signaling processor 502 and the ATM cells from the second interworking unit 508 over the connection 516. The first interworking unit 504 identifies whether the CSI bit 304 is set to one, and, because the CSI bit is set, processes the ATM cells according to a processing option, such as the decompression method. The first interworking unit 504 extracts the correct number of bits from the ATM cells, depending on the decompression method, and then decompresses the bits. The user communications are then in a communication format, such as a 64 kbp/s PCM format, that can be transported to the first communication device 104.

It will be appreciated that the processing system 102 of FIG. 5 also may operate to apply a processing option from static lookup tables in the first and second interworking units 504 and 508. The first and second interworking units 504 and 508 receive a control message that identifies a connection. However, the first and second interworking units 504 and 508 do not receive a control message that identifies a compression or decompression method or an encryption or de-encryption method from the respective first and second signaling processors 502 and 506. Instead, each of the first and second interworking units 504 and 506 have static lookup tables in which a designated connection is assigned to a designated compression or decompression method or a designated encryption or de-encryption method.

In such a case, the first interworking unit 504 receives the voiceband user communications from the first communication device 104 over the connection 108 and the control message from the first signaling processor 502 that identifies the selected connection 516. The first interworking unit 504 uses the static lookup tables to determine the processing option for the user communications based on either the connection 108 over which the user communications were received or the selected first connection 516. For example, the static lookup tables may specify a compression method for user communications that are transported over the selected first connection 516.

Referring still to FIG. 5, the first interworking unit 504 compresses the user communications according to the specified compression method and interworks the compressed user communications. The first interworking unit 504 sets the CSI bit 304 in the first octet of an ATM cell to one and recalculates and inserts in the first octet the CRC, the parity, and the sequence count. The first interworking unit 504 then fills the remaining forty-seven bytes of the ATM cell with the compressed user communications and transports the ATM cell over the first connection 516. The first interworking unit 504 performs the interworking for all of the user communications.

The second interworking unit 508 receives the ATM cells containing the compressed user communications from the first interworking unit 504 and the control message from the second signaling processor 506 designating the selected second connection 110. The second interworking unit 508 examines the CSI bit 304 in the first octet of the ATM cell to determine whether or not it is set to one. Because the CSI bit 304 is set to one, the second interworking unit 508 processes the remaining bytes in the ATM cell with a processing option identified in the static lookup tables in the second interworking unit. For example, the second interworking unit 508 may process the user communications with a decompression method that is designated for ATM cells received over the selected first connection 516.

To process the user conmmunications, the second interworking unit 508 interworks the user communications according to the decompression method by first extracting the correct number of bits, depending on which compression method was used by the first interworking unit 504 and which decompression method was chosen to decompress the user communications. For example, if the user communications were compressed to 32 kbp/s, four bits per byte are extracted. The second interworking unit 508 then decompresses the user communications according to the selected decompression method and transports the user communications over the selected second connection 110 in a communication format. Generally, the voiceband user communications are transported over the selected second connection 110 in the PCM or ADPCM format over a circuit-based connection at 64 kbp/s. Compression is ended, and the call is disconnected, as described above.

It will be appreciated that the processing system 102 of FIG. 5 also may operate to transport a call from the second communication device 106 to the first communication device 104. The call may be processed with a processing option from a static lookup table.

In such a case, the processing system 102 operates in the reverse of the operation as described above so that the second interworking unit 508 receives the voiceband user communications from the second communication device 106. The second interworking unit 508 processes the user communications with a processing option, such as a compression method. The processing option is selected based on the connection 110 over which the user communications were received or the connection 516 over which they will be transported in ATM cells. The second interworking unit 508 interworks the user communications to ATM cells that identify the selected connection 516, including setting the CSI bit 304 and filling the ATM cells. The second interworking unit 508 then transports the ATM cells over the connection 516.

The first interworking unit 504 receives the ATM cells from the second interworking unit 508 over the connection 516. The first interworking unit 504 identifies whether the CSI bit 304 is set to one, and, because the CSI bit is set, processes the ATM cells according to a processing option, such as a decompression method. The processing option is selected based on the connection 516 over which the user communications were received or the connection 108 over which the voiceband user communications will be transported. The first interworking unit 504 extracts the correct number of bits from the ATM cells, depending on the decompression method, and then decompresses the bits. The user communications are then in a communication format, such as a 64 kbp/s PCM format, that can be transported to the first communication device 104.

Figure 6:
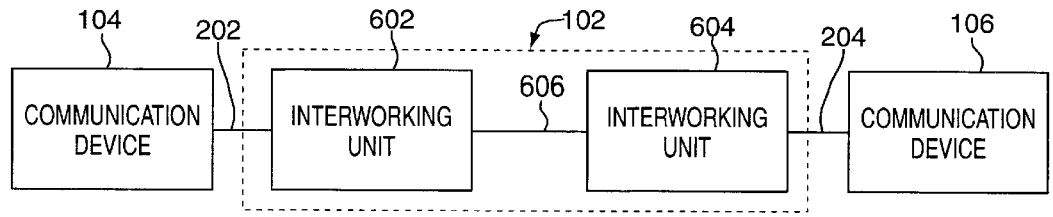
FIG. 6 is a block diagram of an expansion of the system of the present invention operating in-band.

FIG. 6 illustrates components of the processing system 102 as the processing system operates to process in-band call signaling. The processing system 102 has a first interworking unit 602 and a second interworking unit 604 connected by a connection 606. The processing system 102 interacts with the first communication device 104 and the second communication device 106.

The first interworking unit 602 interworks traffic between various protocols. Preferably, the first interworking unit 602 interworks between ATM traffic and non-ATM traffic.

The first interworking unit 602 is configured with static lookup tables. The first interworking unit 602 uses the static lookup tables to determine which processing option, such as a compression method, an encryption method, or a compression method and an encryption method, is to be applied, if at all, to the user communications. Thus, the first interworking unit 602 may apply a particular compression method or encryption method for a particular VPI/VCI connection over which user communications are transported. In addition, the first interworking unit 602 will apply a particular decompression method, de-encryption method, or decompression method and de-encryption method for a particular VPI/VCI connection from which user communications are received. A preferred interworking unit is discussed below.

The second interworking unit 604 interworks traffic between various protocols. Preferably, the second interworking unit 604 interworks between ATM traffic and non-ATM traffic.

The second interworking unit 604 is configured with static lookup tables. The second interworking unit 604 uses the static lookup tables to determine which processing option, such as a compression method, an encryption method, or a compression method and an encryption method, is to be applied, if at all, to the user communications. Thus, the second interworking unit 604 may apply a particular compression method or encryption method for a particular VPI/VCI connection over which user communications are transported. In addition, the second interworking unit 604 may apply a particular decompression method, de-encryption method, or decompression method and de-encryption method for a particular VPI/VCI connection from which user communications are received. A preferred interworking unit is discussed below.

With reference to FIG. 3 and FIG. 6, the processing system 102 operates to process in-band calls in the following manner. The first communication device 104 transports a call, including voiceband user communications and in-band call signaling, to the first interworking unit 602. Typically, the call is transported as a 64 kbp/s voiceband payload call.

The first interworking unit 602 uses the static lookup table to identify a processing option, such as a compression method, an encryption method, or a compression method and an encryption method, with which to process the call. The processing option is selected based on the connection 202 over which the user communications were received or the connection 606 over which they will be transported in ATM cells. The processing system 102 may be configured so that calls for particular connections are not processed with a processing option.

When a processing method has been identified, the first interworking unit 602 processes the call with the selected method. For example, if a compression method is selected, then the call is processed with the selected compression method. The number of bits packed in a byte depends on the compression method used. If, for example, the 32 kbp/s ADPCM compression method is used, four bits are packed in a byte.

After the first interworking unit 602 processes the call, it sets the CSI bit 304 in the first octet 302 of an ATM cell to one and recalculates and inserts in the first octet the CRC, the parity, and the sequence count. The first interworking unit 602 then fills the remaining forty-seven bytes of the ATM cell with the compressed user communications. The ATM cell identifies the selected first connection 606. The ATM cell then is transported over the selected first connection 606.

The second interworking unit 604 receives the ATM cells. If the second connection 204 is in the on-hook state, the second interworking unit 604 changes the state of the second connection to the off-hook state.

The second interworking unit 604 examines the CSI bit 304 to determine if the CSI bit is set to a one. If the CSI bit 304 is set to a one, the second interworking unit 604 uses the static tables to identify the processing option, such as a decompression method, a de-encryption method, or a decompression method and a de-encryption method, used to process the user communications for the selected connection 606 over which the ATM cells were received. The processing option is selected based on the connection 606 over which the user communications were received in ATM cells or the connection 204 over which the voiceband user communications will be transported.

If, for example, a decompression method is identified, the second interworking unit 604 interworks the user communications according to the decompression method. This involves extracting the appropriate number of bits according to the de-compression method and then decompressing the extracted bits for the user communications. The second interworking unit 604 then transports the decompressed voiceband user communications to the second communications device 106 in a communication format. Generally, the user communications are transported to the second communications device 106 in a 64 kbp/s PCM format.

The user communications continue to be processed by the first interworking unit 602 until an in-band on-hook signal is received by the first interworking unit from the first communication device 104 or from the second communication device 106 via the second interworking unit 604. The first interworking unit 602 then stops transporting ATM cells over the connection 606. When the second interworking unit 604 recognizes that ATM cells are not being transported, the second interworking unit transports an on-hook signal to the second communication device 106.

It will be appreciated that the processing system 102 of FIG. 6 also may operate to transport a call from the second communication device 106 to the first communication device 104. The call may be processed with a processing option.

In such a case, the processing system 102 operates in the reverse of the operation as described above so that the second interworking unit 604 receives the user communications from the second communication device 106. The second interworking unit 604 processes the user communications with a processing option, such as a compression method. The processing option is selected based on the connection 204 over which the user communications were received or the connection 606 over which they will be transported in ATM cells. The second interworking unit 604 interworks the user communications to ATM cells that identify a selected connection 606, including setting the CSI bit 304 and filling the ATM cells. The second interworking unit 604 then transports the ATM cells over the connection.

The first interworking unit 504 receives the ATM cells from the second interworking unit 604 over the connection 606. The first interworking unit 602 identifies whether the CSI bit 304 is set to one, and, because the CSI bit is set, processes the ATM cells according to a processing option, such as a decompression method. The processing option is selected based on the connection 606 over which the user communications were received in ATM cells or the connection 202 over which the voiceband user communications will be transported. The first interworking unit 602 extracts the correct number of bits from the ATM cells, depending on the decompression method, and then decompresses the bits. The user communications are then in a communication format, such as a 64 kbp/s PCM format, that can be transported to the first communication device 104.

Figure 7:
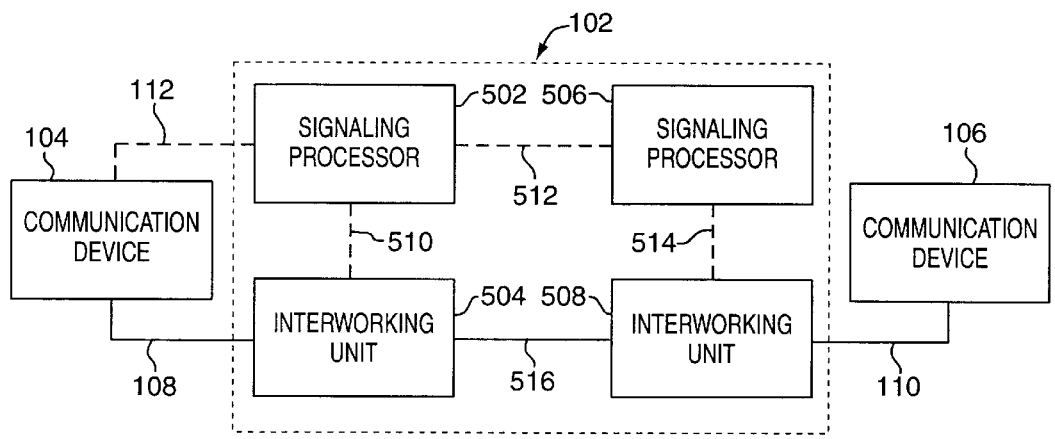
FIG. 7 is a block diagram of an expansion of the system of the present invention operating with an out-of-band signaling communication device and an in-band signaling communication device.

The processing system 102 may operate with a variety of mixed configurations. For example, as illustrated in FIG. 7, the first communication device 104 receives and transports signaling out-of-band, while the second communication device 106 receives and transports signaling in-band. Thus, the configuration of FIG. 7 incorporates portions of the configurations of both FIG. 5 and FIG. 6. The processing system 102 is adapted to recognize the different configuration of the second communication device 106 and transport signaling to, and receive signaling from, the second communication device in the appropriate protocol.

Thus, in the configuration of FIG. 7, the processing system 102 operates similar to the configuration of the processing system of FIG. 5. However, after the second interworking unit 508 receives the ATM cells from the first interworking unit 504 over the selected first connection 516 and the control message from the second signaling processor 506, the second interworking unit 504 determines if the selected second connection 110 is in the off-hook state. If the selected second connection 110 is on-hook, the second interworking unit 508 signals the second communication device 106 in-band to change the state of the selected second connection to off-hook. All other processing proceeds as described above for option processing.

In addition, the disconnect operation of FIG. 7 is unique. Because the connection 110 is in-band, the second interworking unit 508 transports an on-hook signal to the second communication device 106 when a call is disconnected, rather than transporting signaling out-of-band. All other processing proceeds as described above for a call disconnect.

Figure 8:
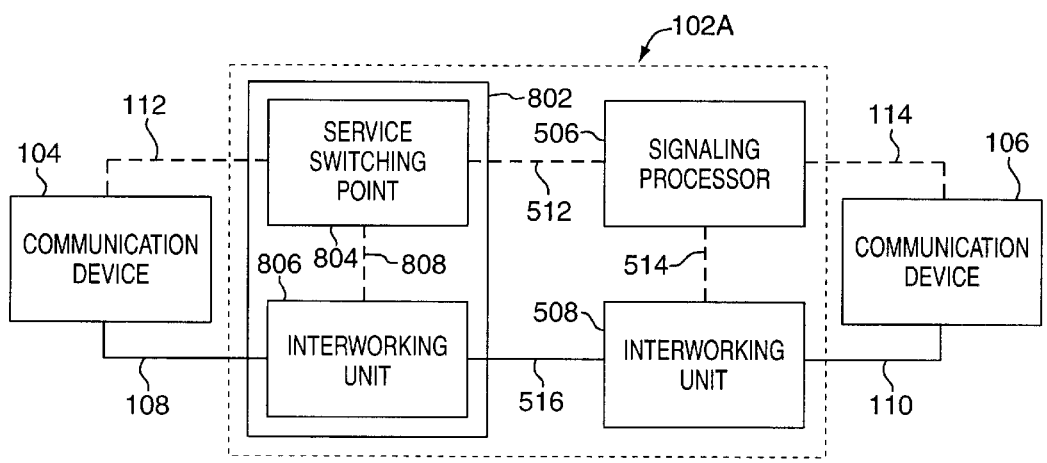
FIG. 8 is a block diagram of an expansion of the system of the present invention operating out-of-band in an asynchronous transfer mode component system.

As illustrated in FIG. 8, the processing system 102A may be configured with an ATM switching unit 802 which contains a service switching point (SSP) 804 and a first interworking unit 806. A link 808 links the SSP 804 and the first interworking unit 806. The processing system 102A also contains a signaling processor 506 and a second interworking unit 508.

The processing system 102A contains a BISUP link 512 between the SSP and the signaling processor 506, a link 514 between the signaling processor and the second interworking unit 508, and a connection 516 between the first interworking unit 806 and the second interworking unit 514. The link 112 to the first communication device 104 and the link 114 to the second communication device 106 are both NISUP links.

The components of the processing system 102A of FIG. 8 are the same as the components of the processing system 102 of FIG. 5, except for the SSP 804. Thus, the first interworking unit 806 of the processing system of FIG. 8 is the same component as the first interworking unit 504 of the processing system 102 of FIG. 5.

However, the ATM switching unit 802 is a BISUP ATM switching unit that contains the NISUP interworking functions. The call signaling processing functions are provided by the SSP 804 to the first interworking unit 806 by an internal control link 808. Other control messages that are transported to the signaling processor 506 occur as described above. Moreover, the process options are selected, identified, and processed as described above for FIG. 5, with the exception that the functions performed by the first signaling processor 502 and first interworking unit 504 of FIG. 5 are performed by the SSP 804 and first interworking unit 806 of FIG. 8, respectively.

THE ATM INTERWORKING UNIT

FIG. 9 shows one embodiment of an interworking unit which is an ATM interworking unit 902 suitable for the present invention for use with a SONET system, but other interworking units that support the requirements of the invention are also applicable. The ATM interworking unit 902 may receive and transmit in-band and out-of-band calls.

The ATM interworking unit 902 has a control interface 904, an OC-N/STS-N interface 906, a DS3 interface 908, a DS1 interface 910, a DS0 interface 912, a signal processor 914, an ATM adaptation layer (AAL) 916, an OC-M/STS-M interface 918, and an ISDN/GR-303 interface 920. As used herein in conjunction with OC or STS, "N" refers to an integer, and "M" refers to an integer.

The control interface 902 accepts control messages from the signaling processor 922. In particular, the control interface 904 identifies DS0 connections and virtual connection assignments in the control messages from the signaling processor 922. These assignments are provided to the AAL 916 for implementation.

The OC-N/STS-N interface 906, the DS3 interface 908, the DS1 interface 910, the DS0 interface 912, and the ISDN/GR-303 interface 920 each can accept calls, including user communications, from a communication device 924. Likewise, the OC-M/STS-M interface 918 can accept calls, including user communications, from a communication device 926.

The OC-N/STS-N interface 906 accepts OC-N formatted calls and STS-N formatted calls and converts the calls from the OC-N or STS-N formats to the DS3 format. The DS3 interface 908 accepts calls in the DS3 format and converts the calls to the DS1 format. The DS3 interface 908 can accept DS3s from the OC-N/STS-N interface 906 or from an external connection. The DS1 interface 910 accepts the calls in the DS1 format and converts the calls to the DS0 format. The DS1 interface 910 can accept DS1s from the DS3 interface 908 or from an external connection. The DS0 interface 912 accepts calls in the DS0 format and provides an interface to the AAL 916. The ISDN/GR-303 interface 920 accepts calls in either the ISDN format or the GR-303 format and converts the calls to the DS0 format. In addition, each interface may transmit signals in like manner to the communication device 924.

The OC-M/STS-M interface 918 is operational to accept ATM cells from the AAL 916 and to transmit the ATM cells over the connection to the communication device 926. The OC-M/STS-M interface 918 may also accept ATM cells in the OC or STS format and transmit them to the AAL 916.

The AAL 916 comprises both a convergence sublayer and a segmentation and reassembly (SAR) sublayer. The AAL 916 is operational to accept communication device information in the DS0 format from the DS0 interface 912 and to convert the communication device information into ATM cells. AALs are known in the art and information about AALs is provided by International Telecommunications Union (ITU) document I.363, which is incorporated fully herein by reference. An AAL for voice calls is described in U.S. patent application Ser. No. 08/395,745, which was filed on Feb. 28, 1995, and entitled "Cell Processing for Voice Transmission," and which is incorporated herein by reference.

The AAL 916 obtains from the control interface 904 the virtual path identifier (VPI) and the virtual channel identifier (VCI) for each DS0 for each call connection. The AAL 916 also obtains the identity of the DS0 for each call (or the DS0s for an N×64 call). The AAL 916 then transfers the communication device information between the identified DS0 and the identified ATM virtual connection. An acknowledgment that the assignments have been implemented may be sent to the signaling processor 922 if desired. Calls with multiple 64 Kilo-bits per second (Kbps) DS0s are known as N×64 calls. If desired, the AAL 916 can be configured to accept control messages through the control interface 904 for N×64 calls.

As discussed above, the ATM interworking unit 902 also handles calls in the opposite direction, that is, in the direction from the OC-M/STS-M interface 918 to the DS0 interface 912, including calls exiting from the DS1 interface 910, the DS3 interface 908, the OC-N/STS-N interface 906, and the ISDN/GR-303 interface 920. For this traffic, the VPI/VCI has been selected already and the traffic has been routed through the cross-connect (not shown). As a result, the AAL 916 only needs to identify the pre-assigned DS0 for the selected VPI/VCI. This can be accomplished through a look-up table. In alternative embodiments, the signaling processor 922 can provide this DS0-VPI/VCI assignment through the control interface 904 to the AAL 916.

A technique for processing VPI/VCIs is disclosed in U.S. patent application Ser. No. 08/653,852, which was filed on May 28, 1996, and entitled "Telecommunications System with a Connection Processing System," and which is incorporated herein by reference.

DS0 connections are bi-directional and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to invoke automatically this second VPI/VCI to provide a bi-directional virtual connection to match the bi-directional DS0 on the call.

In some embodiments, it may be desirable to incorporate digital signal processing capabilities at the DS0 level. It may also be desired to apply echo cancellation to selected DS0 circuits. In these embodiments, a signal processor 914 would be included either separately (as shown) or as a part of the DS0 interface 912. The signaling processor 922 would be configured to send control messages to the ATM interworking unit 902 to implement particular features on particular DS0 circuits. Alternatively, lookup tables may be used to implement particular features for particular circuits or VPI/VCIs.

FIG. 10 shows another embodiment of an interworking unit which is an ATM interworking unit 1002 suitable for the present invention. The ATM interworking unit 902 may receive and transmit in-band and out-of-band calls.

The ATM interworking unit 1002 is for use with an SDH system and has a control interface 1004, an STM-N electrical/optical (E/O) interface 1006, an E3 interface 1008, an E1 interface 1010, an E0 interface 1012, a signal processor 1014, an ATM adaptation layer (AAL) 1016, an STM-M electrical/optical (E/O) interface 1018, and a digital private network signaling system (DPNSS) interface 1020. As used herein in conjunction with STM, "N" refers to an integer, and "M" refers to an integer.

The control interface 1004 accepts control messages from the signaling processor 1022. In particular, the control interface 1004 identifies E0 connections and virtual connection assignments in the control messages from the signaling processor 1022. These assignments are provided to the AAL 1016 for implementation.

The STM-N E/O interface 1006, the E3 interface 1008, the E1 interface 1010, the E0 interface 1012, and the DPNSS interface 1020 each can accept calls, including user communications, from a second communication device 1024. Likewise, the STM-M E/O interface 1018 can accept calls, including user communications, from a third communication device 1026.

The STM-N E/O interface 1006 accepts STM-N electrical or optical formatted calls and converts the calls from the STM-N electrical or STM-N optical format to the E3 format. The E3 interface 1008 accepts calls in the E3 format and converts the calls to the E1 format. The E3 interface 1008 can accept E3s from the STM-N E/O interface 1006 or from an external connection. The E1 interface 1010 accepts the calls in the E1 format and converts the calls to the E0 format. The E1 interface 1010 can accept E1s from the STM-N E/O interface 1006 or the E3 interface 1008 or from an external connection. The E0 interface 1012 accepts calls in the E0 format and provides an interface to the AAL 1016. The DPNSS interface 1020 accepts calls in the DPNSS format and converts the calls to the E0 format. In addition, each interface may transmit signals in a like manner to the communication device 1024.

The STM-M E/O interface 1018 is operational to accept ATM cells from the AAL 1016 and to transmit the ATM cells over the connection to the communication device 1026. The STM-M E/O interface 1018 may also accept ATM cells in the STM-M E/O format and transmit them to the AAL 1016.

The AAL 1016 comprises both a convergence sublayer and a segmentation and reassembly (SAR) sublayer. The AAL 1016 is operational to accept communication device information in the E0 format from the E0 interface 1012 and to convert the communication device information into ATM cells.

The AAL 1016 obtains from the control interface 1004 the virtual path identifier and the virtual channel identifier for each call connection. The AAL 1016 also obtains the identity of each call. The AAL 1016 then transfers the communication device information between the identified E0 and the identified ATM virtual connection. An acknowledgment that the assignments have been implemented may be sent back to the signaling processor 1022 if desired. If desired, the AAL 1016 can be configured to accept control messages through the control interface 1004 for N×64 calls.

As discussed above, the ATM interworking unit 1002 also handles calls in the opposite direction, that is, in the direction from the STM-M E/O interface 1018 to the E0 interface 1012, including calls exiting from the E1 interface 1010, the E3 interface 1008, the STM-N E/O interface 1006, and the DPNSS interface 1020. For this traffic, the VPI/VCI has been selected already and the traffic has been routed through the cross-connect (not shown). As a result, the AAL 1016 only needs to identify the pre-assigned E0 for the selected VPI/VCI. This can be accomplished through a look-up table. In alternative embodiments, the signaling processor 1022 can provide this VPI/VCI assignment through the control interface 1004 to the AAL 1016.

E0 connections are bi-directional and ATM connections typically are uni-directional. As a result, two virtual connections in opposing directions typically will be required for each E0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to automatically invoke this second VPI/VCI to provide a bi-directional virtual connection to match the bi-directional E0 on the call.

In some instances, it may be desirable to incorporate digital signal processing capabilities at the E0 level. Also, it may be desirable apply echo cancellation. In these embodiments, a signal processor 1014 would be included either separately (as shown) or as a part of the E0 interface 1012. The signaling processor 1022 would be configured to send control messages to the ATM interworking unit 1002 to implement particular features on particular circuits. Alternatively, lookup tables may be used to implement particular features for particular circuits or VPIs/VCIs.

THE SIGNALING PROCESSOR

The signaling processor is referred to as a call/connection manager (CCM), and it receives and processes telecommunications call signaling and control messages to select connections that establish communication paths for calls. In the preferred embodiment, the CCM processes ISDN, GR-303, and SS7 signaling to select connections for a call. CCM processing is described in a U.S. Patent Application having attorney docket number 1148, which is entitled "Telecommunication System," which is assigned to the same assignee as this patent application, and which is incorporated herein by reference.

In addition to selecting connections, the CCM performs many other functions in the context of call processing. It not only can control routing and select the actual connections, but it also can validate callers, control echo cancelers, generate billing information, invoke intelligent network functions, access remote databases, manage traffic, and balance network loads. One skilled in the art will appreciate how the CCM described below can be adapted to operate in the above embodiments.

Figure 11:
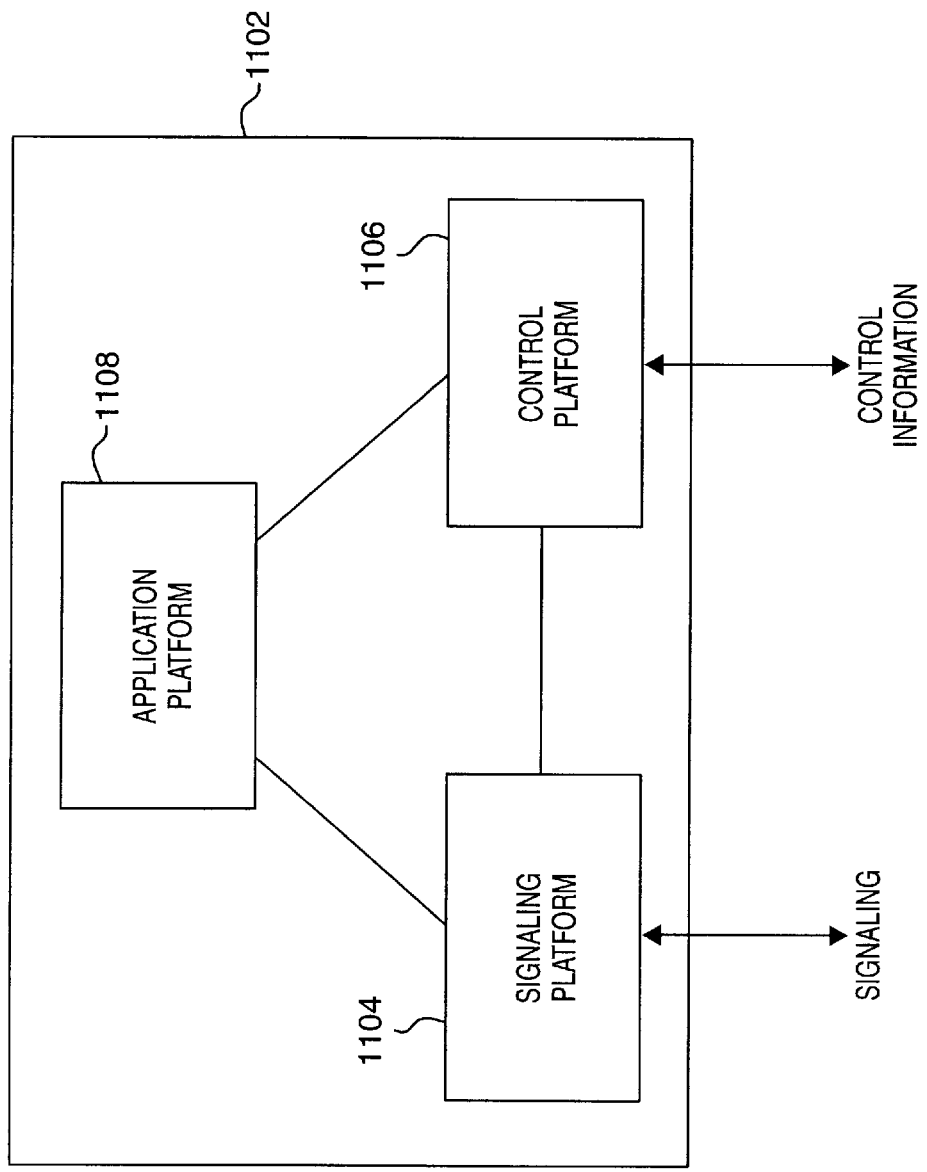
FIG. 11 is a block diagram of a signaling processor constructed in accordance with the present system.

FIG. 11 depicts a version of the CCM. Other versions also are contemplated. In the embodiment of FIG. 11, the CCM 1102 controls an ATM interworking unit, such as an ATM interworking multiplexer (mux) that performs interworking of DS0s and VPI/VCIs. However, the CCM may control other communications devices and connections in other embodiments.

The CCM 1102 comprises a signaling platform 1104, a control platform 1106, and an application platform 1108. Each of the platforms 1104, 1106, and 1108 is coupled to the other platforms.

The signaling platform 1104 is externally coupled to the signaling systems—in particular to SS7 signaling systems having a message transfer part (MTP), an ISDN user part (ISUP), a signaling connection control part (SCCP), an intelligent network application part (INAP), and a transaction capabilities application part (TCAP). The control platform 1106 is externally coupled to an interworking unit control, an echo control, a resource control, billing, and operations.

The signaling platform 1104 preferably is an SS7 platform that comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

The control platform 1106 is comprised of various external interfaces including an interworking unit interface, an echo interface, a resource control interface, a billing interface, and an operations interface. The interworking unit interface exchanges messages with at least one interworking unit. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of the CCM 1102. One skilled in the art will appreciate how to produce the software for the interfaces in the control platform 1106.

The application platform 1108 is functional to process signaling information from the signaling platform 1104 in order to select connections. The identity of the selected connections are provided to the control platform 1106 for the interworking unit interface. The application platform 1108 is responsible for validation, translation, routing, call control, exceptions, screening, and error handling. In addition to providing the control requirements for the interworking unit, the application platform 1108 also provides requirements for echo control and resource control to the appropriate interface of the control platform 1106. In addition, the application platform 1108 generates signaling information for transmission by the signaling platform 1104. The signaling information might be ISUP, INAP, or TCAP messages to external network elements. Pertinent information for each call is stored in a call control block (CCB) for the call. The CCB can be used for tracking and billing the call.

The application platform 1108 operates in general accord with the Basic Call Model (BCM) defined by the ITU. An instance of the BCM is created to handle each call. The BCM includes an originating process and a terminating process. The application platform 1108 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for the application platform 1108 can be produced in specification and description language (SDL) defined in ITU-T Z.100. The SDL can be converted into C code. Additional C and C++ code can be added as required to establish the environment.

The CCM 1102 can be comprised of the above-described software loaded onto a computer. The computer can be an Integrated Micro Products (IMP) FT-Sparc 600 using the Solaris operating system and conventional database systems.

It may be desirable to utilize the multi-threading capability of a Unix operating system.

From FIG. 11, it can be seen that the application platform 1108 processes signaling information to control numerous systems and facilitate call connections and services. The SS7 signaling is exchanged with external components through the signaling platform 1104, and control information is exchanged with external systems through the control platform 1106. Advantageously, the CCM 1102 is not integrated into a switch central processing unit (CPU) that is coupled to a switching matrix. Unlike an SCP, the CCM 1102 is capable of processing ISUP messages independently of TCAP queries.

SS7 MESSAGE DESIGNATIONS

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.

CCM TABLES

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 12:
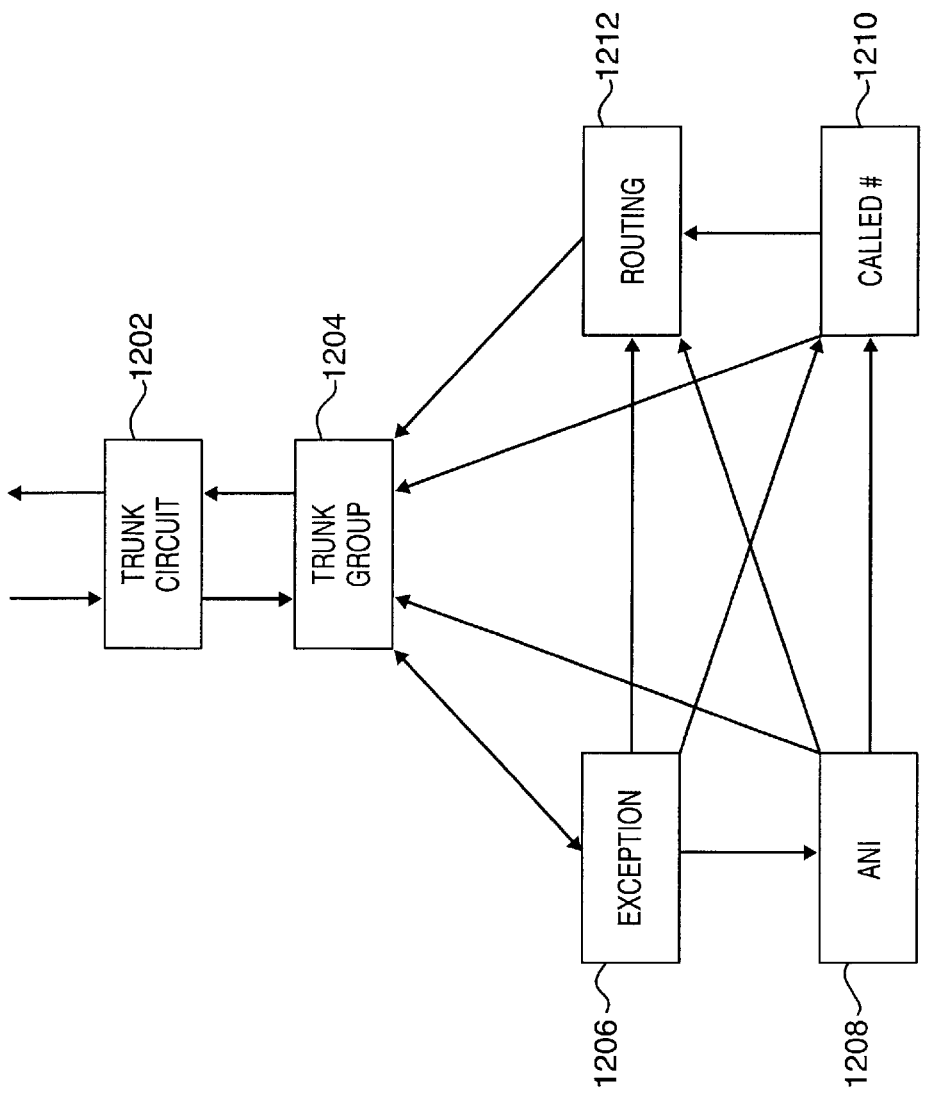
FIG. 12 is a block diagram of a data structure having tables that are used in the signaling processor of FIG. 11.

FIG. 12 depicts a data structure used by the application platform 1108 to execute the BCM. This is accomplished through a series of tables that point to one another in various ways. The pointers are typically comprised of next function and next index designations. The next function points to the next table, and the next index points to an entry or a range of entries in that table. The data structure has a trunk circuit table 1202, a trunk group table 1204, an exception table 1206, an ANI table 1208, a called number table 1210, and a routing table 1212.

The trunk circuit table 1202 contains information related to the connections. Typically, the connections are DS0 or ATM connections. Initially, the trunk circuit table 1202 is used to retrieve information about the originating connection. Later, the table is used to retrieve information about the terminating connection. When the originating connection is being processed, the trunk group number in the trunk circuit table 1202 points to the applicable trunk group for the originating connection in the trunk group table 1204.

The trunk group table 1204 contains information related to the originating and terminating trunk groups. When the originating connection is being processed, the trunk group table 1204 provides information relevant to the trunk group for the originating connection and typically points to the exception table 1206.

The exception table 1206 is used to identify various exception conditions related to the call that may influence the routing or other handling of the call. Typically, the exception table 1206 points to the ANI table 1208. Although, the exception table 1206 may point directly to the trunk group table 1204, the called number table 1210, or the routing table 1212.

The ANI table 1208 is used to identify any special characteristics related to the caller's number. The caller's number is commonly known as automatic number identification (ANI). The ANI table 1208 typically points to the called number table 1210. Although, the ANI table 1208 may point directly to the trunk group table 1204 or the routing table 1212.

The called number table 1210 is used to identify routing requirements based on the called number. This will be the case for standard telephone calls. The called number table 1210 typically points to the routing table 1212. Although, it may point to the trunk group table 1204.

The routing table 1212 has information relating to the routing of the call for the various connections. The routing table 1212 is entered from a pointer in the exception table 1206, the ANI table 1208, or the called number table 1210. The routing table 1212 typically points to a trunk group in the trunk group table 1204.

When the exception table 1206, the ANI table 1208, the called number table 1210, or the routing table 1212 point to the trunk group table 1204, they effectively select the terminating trunk group. When the terminating connection is being processed, the trunk group number in the trunk group table 1204 points to the trunk group that contains the applicable terminating connection in the trunk circuit table 1204.

The terminating trunk circuit is used to extend the call. The trunk circuit is typically a VPI/VCI or a DS0. Thus, it can be seen that by migrating through the tables, a terminating connection can be selected for a call.

Figure 13:
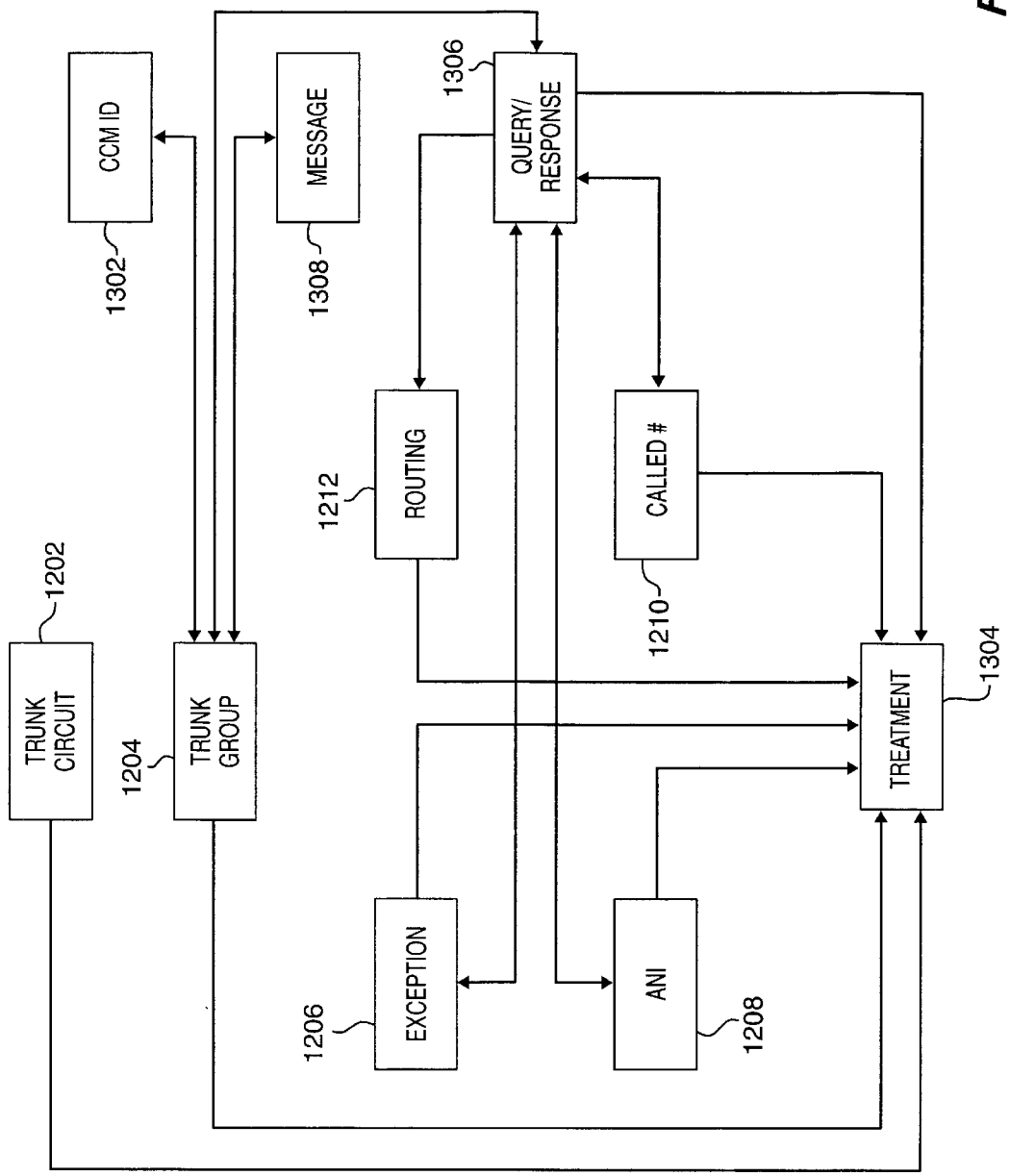
FIG. 13 is a block diagram of additional tables that are used in the signaling processor of FIG. 12.

FIG. 13 is an overlay of FIG. 12. The tables from FIG. 12 are present, but for clarity, their pointers have been omitted. FIG. 13 illustrates additional tables that can be accessed from the tables of FIG. 12. These include a CCM ID table 1302, a treatment table 1304, a query/response table 1306, and a message table 1308.

The CCM ID table 1302 contains various CCM SS7 point codes. It can be accessed from the trunk group table 1204, and it points back to the trunk group table 1204.

The treatment table 1304 identifies various special actions to be taken in the course of call processing. This will typically result in the transmission of a release message (REL) and a cause value. The treatment table 1304 can be accessed from the trunk circuit table 1202, the trunk group table 1204, the exception table 1206, the ANI table 1208, the called number table 1210, the routing table 1212, and the query/response table 1306.

The query/response table 1306 has information used to invoke the SCF. It can be accessed by the trunk group table 1204, the exception table 1206, the ANI table 1208, the called number table 1210, and the routing table 1212. It points to the trunk group table 1204, the exception table 1206, the ANI table 1208, the called number table 1210, the routing table 1212, and the treatment table 1304.

The message table 1308 is used to provide instructions for messages from the termination side of the call. It can be accessed by the trunk group table 1204 and points to the trunk group table 1204.

FIGS. 14–21 depict examples of the various tables described above. FIG. 14 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DS0 or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 15 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 16 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 17 depicts an example of the ANI table. The index is used to enter the fields of the table. The calling party category differentiates among types of calling parties, for example, test calls, emergency calls, and ordinary calls. The calling party/charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 18 depicts an example of the called number table. The index is used to enter the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 16. The next function and next index point to the next table which is typically the routing table.

FIG. 19 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/ index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 14–19 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 20 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 21 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

Those skilled in the art will appreciate that variations from the specific embodiments disclosed above are contemplated by the invention. The invention should not be restricted to the above embodiments, but should be measured by the following claims.

What is claimed is:

1. A system for transporting a call having user communications and call signaling, the system comprising:

a signaling processor adapted to receive the call signaling, to process the call signaling to select a connection, and to transport a control message that identifies the selected connection; and an interworking unit adapted to receive the user communications in a communication format, to receive the control message from the signaling processor, to process the user communications according to an identified processing option, to interwork the user communications between the communication format and an asynchronous transfer mode format, to set a convergence sublayer indicator in the asynchronous transfer mode formatted user communications to indicate that the user communications are processed according to the processing option, and to transport the processed user communications in the asynchronous transfer mode format over the selected connection.

2. The system of claim 1 wherein the processing option comprises a compression method.

3. The system of claim 2 wherein the compression method comprises a 32 kilo-bits per second adaptive difference pulse code modulation compression method.

4. The system of claim 1 wherein the processing option comprises an encryption method.

5. The system of claim 1 wherein the signaling processor is adapted to select the processing option and to identify the selected processing option in the control message.

6. The system of claim 1 wherein the signaling processor is adapted to select the processing option and to transport a second control message to the interworking unit that identifies the selected processing option.

7. The system of claim 1 wherein the interworking unit is adapted to select the processing option using a static lookup table.

8. The system of claim 7 wherein the interworking unit is adapted to select the processing option based on the selected connection over which the interworking unit transports the processed user communications in the asynchronous transfer mode format.

9. The system of claim 1 further comprising a second interworking unit adapted to receive the processed user communications in the asynchronous transfer mode format from the interworking unit, to identify the convergence sublayer indicator bit, and to interwork the asynchronous transfer mode formatted processed user communications according to a second processing option to convert the asynchronous transfer mode formatted processed user communications to user communications having a second communication format if the convergence sublayer indicator bit is set.

10. The system of claim 9 wherein the second processing option comprises a decompression method.

11. The system of claim 9 wherein the second processing option comprises a de-encryption method.

12. The system of claim 9 wherein the signaling processor is adapted to transport a second control message that identifies the selected connection and wherein the system further comprises a second signaling processor adapted to receive the second control message from the signaling processor, to determine the second processing option, and to transport a third control message to the second interworking unit identifying the second processing option.

13. The system of claim 12 wherein the second processing option comprises a decompression method.

14. The system of claim 13 further comprising a first communication device adapted to transport the user communications in the communication format to the interworking unit.

15. The system of claim 14 further comprising a second communication device adapted to receive the user communications in the second communication format from the second interworking unit.

16. The system of claim 15 wherein the communication format and the second communication format are the same.

17. The system of claim 16 wherein the communication format and the second communication format are a sixty-four kilo-bits per second pulse code modulation format.

18. A system for transporting a call having user communications and call signaling, the system comprising:

a first signaling processor adapted to receive the call signaling, to process the call signaling to select a first connection, to transport a first control message that identifies the selected first connection, and to transport a second control message that identifies the selected first connection;

a first interworking unit adapted to receive the user communications in a first communication format, to receive the first control message from the signaling processor, to process the user communications according to a first processing option, to interwork the processed user communications between the first communication format and asynchronous transfer mode cells that identify the selected first connection, to set an indicator in the asynchronous transfer mode cells to indicate that the user communications are processed according to the first processing option, and to transport the asynchronous transfer mode cells over the selected first connection;

a second signaling processor adapted to receive the second control message identifying the selected first connection, to process the second control message to select a second connection, and to transport a third control message identifying the selected second connection; and a second interworking unit adapted to receive the third control message from the second signaling processor and to receive the asynchronous transfer mode cells over the selected first connection from the first interworking unit, to interwork the asynchronous transfer mode cells according to a second processing option to convert the asynchronous transfer mode cells to user communications having a second communication format if the indicator is set, and to transport the user communications over the selected second connection in the second communication format.

19. The system of claim 18 wherein the first processing option comprises a compression method.

20. The system of claim 19 wherein the compression method comprises an adaptive difference pulse code modulation compression method.

21. The system of claim 19 wherein the second processing option comprises a decompression method.

22. The system of claim 18 wherein the first processing option comprises an encryption method.

23. The system of claim 22 wherein the second processing option comprises a de-encryption method.

24. The system of claim 18 wherein the second processing option comprises a decompression method.

25. The system of claim 18 wherein the second processing option comprises a de-encryption method.

26. The system of claim 18 wherein the first signaling processor is adapted to select the first processing option and to identify the selected first processing option in the first control message.

27. The system of claim 18 wherein the first signaling processor is adapted to select the first processing option and to transport a fourth control message to the first interworking unit that identifies the selected first processing option.

28. The system of claim 18 wherein the first interworking unit is adapted to select the first processing option using a static lookup table.

29. The system of claim 28 wherein the first interworking unit is adapted to select the first processing option based on the selected first connection over which the first interworking unit transports the asynchronous transfer mode cells.

30. The system of claim 18 wherein the second signaling processor is adapted to select the second processing option and to identify the selected second processing option in the third control message.

31. The system of claim 18 wherein the second signaling processor is adapted to select the second processing option and to transport a fourth control message to the second interworking unit that identifies the selected second processing option.

32. The system of claim 18 wherein the second interworking unit is adapted to select the second processing option using a static lookup table.

33. The system of claim 32 wherein the second interworking unit is adapted to select the second processing option based on the selected first connection over which the second interworking unit receives the asynchronous transfer mode cells.

34. The system of claim 32 wherein the second interworking unit is adapted to select the second processing option based on the selected second connection over which the second interworking unit transports the user communications in the second communication format.

35. The system of claim 34 further comprising a first communication device adapted to transport the user communications in the first communication format to the first interworking unit.

36. The system of claim 35 further comprising a second communication device adapted to receive the user communications in the second communication format from the second interworking unit over the selected second connection.

37. The system of claim 36 wherein the first communication format and the second communication format each comprise a sixty-four kilo-bits per second pulse code modulation format.

38. The system of claim 18 wherein:
the second interworking unit further is adapted to receive second user communications in the second communication format, to process the second user communications according to a third processing option, to interwork the processed second user communications between the second communication format and second asynchronous transfer mode cells that identify a selected third connection, to set a second indicator in the second asynchronous transfer mode cells to indicate that the user communications are processed according to the third processing option, and to transport the second asynchronous transfer mode cells over the selected third connection; and
the second interworking unit adapted to receive the second asynchronous transfer mode cells over the selected third connection from the second interworking unit, to interwork the second asynchronous transfer mode cells according to a fourth processing option to convert the second asynchronous transfer mode cells to second user communications having a fourth communication format if the second indicator is set, and to transport the second user communications over a selected fourth connection in the fourth communication format.

39. A system for transporting a call having voiceband user communications, the system comprising:
a first interworking unit adapted to receive the voiceband user communications in a first communication format, to process the voiceband user communications according to a first processing option, to convert the user communications to asynchronous transfer mode cells that identify a selected connection, to set a convergence sublayer indicator bit in the asynchronous transfer mode cells to identify that the voiceband user communications have been processed according to the first processing option, and to transport the asynchronous transfer mode cells over the selected connection; and
a second interworking unit adapted to receive the asynchronous transfer mode cells over the selected connection, to identify the convergence sublayer indicator bit, and to interwork the asynchronous transfer mode cells according to a second processing option to convert the asynchronous transfer mode cells to voiceband user communications having a second communication format if the convergence sublayer indicator bit is set.

40. The system of claim 39 wherein the first processing option comprises a compression method.

41. The system of claim 40 wherein the compression method comprises a 16 kilo-bits per second adaptive difference pulse code modulation compression method.

42. The system of claim 40 wherein the second processing option comprises a decompression method.

43. The system of claim 39 wherein the first processing option comprises an encryption method.

44. The system of claim 43 wherein the second processing option comprises a de-encryption method.

45. The system of claim 39 wherein the second processing option comprises a decompression method.

46. The system of claim 39 wherein the second processing option comprises a de-encryption method.

47. The system of claim 39 wherein the first interworking unit is adapted to select the first processing option using a static lookup table.

48. The system of claim 47 wherein the first interworking unit is adapted to select the first processing option based on the selected connection over which the first interworking unit transports the asynchronous transfer mode cells.

49. The system of claim 47 wherein the system further comprises a communication device adapted to transport the voiceband user communications in the first communication format over a selected second connection to the first interworking unit and wherein the first interworking unit is adapted to select the first processing option based on the selected second connection over which the second interworking unit receives the voiceband user communications in the first communication format.

50. The system of claim 39 wherein the second interworking unit is adapted to select the second processing option using a static lookup table.

51. The system of claim 50 wherein the second interworking unit is adapted to select the second processing option based on the selected connection over which the second interworking unit receives the asynchronous transfer mode cells.

52. The system of claim 50 wherein the system further comprises a communication device adapted to receive the voiceband user communications in the second communication format over a selected second connection and wherein the second interworking unit is adapted to select the second processing option based on the selected second connection over which the second interworking unit transports the voiceband user communications in the second communication format.

53. The system of claim 39 wherein the first communication format and the second communication format are the same.

54. The system of claim 53 wherein the first communication format and the second communication format comprise a sixty-four kilo-bits per second pulse code modulation format.

55. The system of claim 39 wherein:
the second interworking unit further is adapted to receive second user communications in the second communication format, to process the second user communications according to a third processing option, to interwork the processed second user communications between the second communication format and second asynchronous transfer mode cells that identify a selected third connection, to set a second convergence sublayer indicator bit in the second asynchronous transfer mode cells to indicate that the user communications are processed according to the third processing option, and to transport the second asynchronous transfer mode cells over the selected third connection; and
the second interworking unit adapted to receive the second asynchronous transfer mode cells over the selected third connection from the second interworking unit, to interwork the second asynchronous transfer mode cells according to a fourth processing option to convert the second asynchronous transfer mode cells to second user communications having a fourth communication format if the second convergence sublayer indicator bit is set, and to transport the second user communications over a selected fourth connection in the fourth communication format.

56. A system for transporting a call having voiceband user communications, the system comprising:
a first communication device adapted to transport the voiceband user communications in a first communication format;
a first interworking unit adapted to receive the voiceband user communications from the first communication device, to compress the voiceband user communications according to a selected compression method, to convert the user communications to asynchronous transfer mode cells that identify a selected connection, to set a convergence sublayer indicator bit in the asynchronous transfer mode cells to indicate that the voiceband user communications have been compressed, and to transport the asynchronous transfer mode cells over the selected connection;
a second interworking unit adapted to receive the asynchronous transfer mode cells from the first interworking unit over the selected connection, to identify the convergence sublayer indicator bit, to convert the asynchronous transfer mode cells to the voiceband user communications with a second communication format according to a selected decompression method if the convergence sublayer indicator bit is set, and to transport the decompressed voiceband user communications in the second communication format; and
a second communication device adapted to receive the decompressed voiceband user communications from the second interworking unit.

57. The system of claim 56 wherein the compression method comprises a 16 kilo-bits per second adaptive difference pulse code modulation compression method.

58. The system of claim 56 wherein the selected decompression method comprises a sixty-four kilo-bits per second pulse code modulation decompression method.

59. The system of claim 56 wherein the first interworking unit is adapted to select the selected compression method using a static lookup table.

60. The system of claim 59 wherein the first interworking unit is adapted to select the selected compression method based on the selected connection over which the first interworking unit transports the asynchronous transfer mode cells.

61. The system of claim 59 wherein the first communication device is adapted to transport the voiceband user communications in the first communication format over a selected second connection to the first interworking unit and wherein the first interworking unit is adapted to select the selected compression method based on the selected second connection over which the second interworking unit receives the voiceband user communications in the first communication format.

62. The system of claim 56 wherein the second interworking unit is adapted to select the selected decompression method using a static lookup table.

63. The system of claim 62 wherein the second interworking unit is adapted to select the selected decompression method based on the selected connection over which the second interworking unit receives the asynchronous transfer mode cells.

64. The system of claim 62 wherein the second communication device is adapted to receive the voiceband user communications in the second communication format over a selected second connection and wherein the second interworking unit is adapted to select the selected decompression method based on the selected second connection over which the second interworking unit transports the voiceband user communications in the second communication format.

65. The system of claim 56 wherein the first communication format and the second communication format are the same.

66. The system of claim 65 wherein the first communication format and the second communication format comprise a sixty-four kilo-bits per second pulse code modulation format.

67. A method for transporting a call having voiceband user communications through an asynchronous transfer mode system, the voiceband user communications having a first communication format, the method comprising:
- processing the voiceband user communications with a first processing option;
- interworking the processed voiceband user communications from the first communication format to asynchronous transfer mode cells that identify a selected connection;
- setting an indicator in the asynchronous transfer mode cells to indicate that the voiceband user communications have been processed with the first processing option;
- transporting the asynchronous transfer mode cells on the selected connection;
- receiving the asynchronous transfer mode cells and examining the indicator to determine if the indicator is set; and
- interworking the asynchronous transfer mode cells to the voiceband user communications with a second communication format according to a second processing option if the indicator is set.

68. The method of claim 67 wherein processing the voiceband user communications with a first processing option comprises compressing the voiceband user communications with a compression method.

69. The method of claim 67 wherein processing the voiceband user communications with a first processing option comprises encrypting the voiceband user communications with an encryption method.

70. The method of claim 67 wherein setting an indicator comprises setting a convergence sublayer indicator bit.

71. The method of claim 70 wherein examining the indicator comprises examining the convergence sublayer indicator bit.

72. The method of claim 67 wherein the second processing option comprises a decompression method.

73. The method of claim 67 wherein the second processing option comprises a de-encryption method.

74. The method of claim 67 wherein the first communication format comprises a sixty-four kilo-bits per second pulse code modulation format.

75. The method of claim 67 wherein the second communication format comprises a sixty-four kilo-bits per second pulse code modulation format.

76. A method for transporting a call through an asynchronous transfer mode system, the call having voiceband user communications, the method comprising:
- processing the voiceband user communications with a first processing option;
- setting an indicator in an asynchronous transfer mode cell and filling the asynchronous transfer mode cell with processed voice user communications, the asynchronous transfer mode cell identifying a selected connection;
- transporting the asynchronous transfer mode cell over the selected connection and receiving the asynchronous transfer mode cell;
- processing the asynchronous transfer mode cell according to a second processing option if the indicator is set.

77. The method of claim 76 wherein processing the voiceband user communications with a first processing option comprises compressing the voiceband user communications with a compression method.

78. The method of claim 76 wherein processing the voiceband user communications with a first processing option comprises encrypting the voiceband user communications with an encryption method.

79. The method of claim 76 wherein setting an indicator comprises setting a convergence sublayer indicator bit.

80. The method of claim 76 wherein the second processing option comprises a decompression method.

81. The method of claim 76 wherein the second processing option comprises a de-encryption method.

82. A method for transporting a call through an asynchronous transfer mode system, the call having voiceband user communications located in an asynchronous transfer mode cell, the method comprising:
- setting a convergence sublayer indicator bit in the asynchronous transfer mode cell if the voiceband user communications are processed with a selected compression method;
- transporting the asynchronous transfer mode cell; and
- processing the asynchronous transfer mode cell with a selected decompression method for the voiceband user communications in a communication format if the convergence sublayer indicator bit in the asynchronous transfer mode cell is set.

83. The method of claim 82 further wherein the communication format comprises a sixty-four kilo-bits per second pulse code modulation format.

84. The method of claim 82 further comprising transporting the voiceband user communications in the communication format over a selected connection to a communication device.

85. A method for transporting a call through an asynchronous transfer mode system, the call having voiceband user communications and call signaling, the method comprising:
- processing the call signaling in a first signaling processor to select a connection;
- transmitting a control message from the first signaling processor identifying the selected connection;
- receiving the control message and the voiceband user communications in a first interworking unit and processing the voiceband user communications with a first processing option in the first interworking unit;
- setting an indicator in an asynchronous transfer mode cell, filling the cell with processed voiceband user communications, and transporting the cell over the selected connection from the first interworking unit;
- receiving the cell in a second interworking unit and processing the cell in the second interworking unit according to a second processing option if the indicator is set.

86. The method of claim 85 wherein processing the voiceband user communications with a first processing option comprises compressing the voiceband user communications with a compression method.

87. The method of claim 85 wherein processing the voiceband user communications with a first processing option comprises encrypting the voiceband user communications with an encryption method.

88. The method of claim 85 further comprising selecting the first processing option in the first signaling processor.

89. The method of claim 85 further comprising selecting the first processing option in the first interworking unit.

90. The method of claim 85 wherein setting an indicator comprises setting a convergence sublayer indicator bit.

91. The method of claim 85 wherein the second processing option comprises a decompression method.

92. The method of claim 85 wherein the second processing option comprises a de-encryption method.

93. The method of claim 85 further comprising selecting the second processing option in a second signaling processor and identifying the second processing option in the second control message transported to the second interworking unit by the second signaling processor.

94. The method of claim 85 further comprising selecting the second processing option in the second interworking unit.

95. The method of claim 85 further comprising:

processing second call signaling in the second signaling processor to select a second connection;

transmitting a second control message from the second signaling processor identifying the selected second connection;

receiving the second control message and second voiceband user communications in the second interworking unit and processing the second voiceband user communications with a third processing option in the second interworking unit;

setting a second indicator in a second asynchronous transfer mode cell, filling the second cell with processed second voiceband user communications, and transporting the second cell over the selected second connection from the second interworking unit;

receiving the second cell in the first interworking unit and processing the second cell in the first interworking unit according to a third processing option if the second indicator is set.

96. A system for transporting a call having voiceband user communications through an asynchronous transfer mode system, the system comprising:

a first communication device adapted to transport the call in a communication format;

a second communication device adapted to receive the call;

a first signaling processor adapted to transport a first control message identifying a selected compression method and a selected first connection and to transport a second control message identifying the selected compression method;

a first interworking unit adapted to receive the voiceband user communications from the first communication device, to receive the first control message from the first signaling processor, to compress the voiceband user communications according to the selected compression method identified in the control message, to convert the compressed voiceband user communications to asynchronous transfer mode cells that identify the selected first connection, and to transport the asynchronous transfer mode cells on the selected first connection;

a second signaling processor adapted to receive and process the second control message and, in response thereto, to transport a third control message identifying a selected decompression method and a selected third connection; and a second interworking unit adapted to receive the asynchronous transfer mode cells from the first interworking unit, to receive the third control message from the second signaling processor, to convert the asynchronous transfer mode cells according to the selected decompression method identified in the third control message to the voiceband user communications in a format processable by the second communication device, and to transport the user communications to the second communication device.

97. The system of claim 96 wherein the compression method comprises an adaptive difference pulse code modulation compression method.

98. The system of claim 96 wherein the decompression method comprises a pulse code modulation decompression method.

* * * * *